United States Patent
Wang et al.

(10) Patent No.: US 7,506,022 B2
(45) Date of Patent: *Mar. 17, 2009

(54) WEB ENABLED RECOGNITION ARCHITECTURE

(75) Inventors: Kuansan Wang, Bellevue, WA (US); Hsiao-Wuen Hon, Woodinville, WA (US)

(73) Assignee: Microsoft.Corporation, Redmond, WA (US)

( * ) Notice: Subject to any disclaimer, the term of this patent is extended or adjusted under 35 U.S.C. 154(b) by 274 days.

This patent is subject to a terminal disclaimer.

(21) Appl. No.: 09/960,232

(22) Filed: Sep. 20, 2001

(65) Prior Publication Data

US 2003/0009517 A1    Jan. 9, 2003

Related U.S. Application Data

(60) Provisional application No. 60/289,041, filed on May 4, 2001.

(51) Int. Cl.
*G06F 15/16* (2006.01)
*G10L 11/00* (2006.01)

(52) U.S. Cl. .............. 709/203; 709/216; 704/270.1
(58) Field of Classification Search ......... 709/201–203, 709/206, 217–219, 227–230; 704/270–278, 704/251, 27.1
See application file for complete search history.

(56) References Cited

U.S. PATENT DOCUMENTS

| | | | |
|---|---|---|---|
| 5,303,327 A | 4/1994 | Sturner et al. ............... 704/270 |
| 5,559,897 A | 9/1996 | Brown et al. ................. 382/186 |
| 5,566,272 A | 10/1996 | Brems et al. ................. 704/231 |
| 5,664,061 A | 9/1997 | Andreshak et al. ........... 704/275 |
| 5,737,489 A | 4/1998 | Chou et al. .................. 704/256 |
| 5,774,628 A * | 6/1998 | Hemphill ..................... 704/255 |
| 5,819,220 A | 10/1998 | Sarukkai et al. ............. 704/243 |
| 5,890,123 A | 3/1999 | Brown et al. .............. 704/270.1 |
| 5,960,399 A * | 9/1999 | Barclay et al. ............ 704/270.1 |
| 6,078,886 A | 6/2000 | Dragosh et al. ............. 704/270 |
| 6,101,472 A | 8/2000 | Giangarra et al. ........... 704/275 |
| 6,188,985 B1 | 2/2001 | Thrift et al. |

(Continued)

FOREIGN PATENT DOCUMENTS

EP    0854418 A2    1/1998

(Continued)

OTHER PUBLICATIONS

Using the HTML Converter, Sun Microsystems, Jun. 8, 2001.*

(Continued)

*Primary Examiner*—Yasin M Barqadle
(74) *Attorney, Agent, or Firm*—Steven M. Koehler; Westman, Champlin & Kelly, P.A.

(57) ABSTRACT

A server/client system for processing data includes a network having a web server with information accessible remotely. A client device includes a microphone and a rendering component such as a speaker or display. The client device is configured to obtain the information from the web server and record input data associated with fields contained in the information. The client device is adapted to send the input data to a remote location with an indication of a grammar to use for recognition. A recognition server receives the input data and the indication of the grammar. The recognition server returns data indicative of what was recognized to at least one of the client and the web server.

24 Claims, 16 Drawing Sheets

U.S. PATENT DOCUMENTS

| | | | |
|---|---|---|---|
| 6,192,338 B1 | 2/2001 | Haszto et al. | 704/257 |
| 6,203,495 B1 * | 3/2001 | Bardy | 600/301 |
| 6,240,391 B1 | 5/2001 | Ball et al. | 704/270 |
| 6,243,443 B1 * | 6/2001 | Low et al. | 379/88.17 |
| 6,269,336 B1 | 7/2001 | Ladd et al. | 704/270 |
| 6,314,402 B1 | 11/2001 | Monaco et al. | |
| 6,349,132 B1 * | 2/2002 | Wesemann et al. | 378/88.17 |
| 6,366,886 B1 * | 4/2002 | Dragosh et al. | 704/270.1 |
| 6,384,829 B1 | 5/2002 | Prevost et al. | 345/473 |
| 6,385,583 B1 | 5/2002 | Ladd et al. | 704/270 |
| 6,405,170 B1 | 6/2002 | Phillips et al. | 704/270 |
| 6,453,290 B1 * | 9/2002 | Jochumson | 704/231 |
| 6,456,974 B1 | 9/2002 | Baker et al. | 704/270.1 |
| 6,463,413 B1 | 10/2002 | Applebaum et al. | 704/256.2 |
| 6,526,380 B1 * | 2/2003 | Thelen et al. | 704/251 |
| 6,539,359 B1 | 3/2003 | Ladd et al. | |
| 6,564,263 B1 | 5/2003 | Bergman et al. | 709/231 |
| 6,570,078 B2 | 5/2003 | Ludwig | 84/600 |
| 6,587,822 B2 * | 7/2003 | Brown et al. | 704/275 |
| 6,604,075 B1 | 8/2003 | Brown et al. | 704/270.1 |
| 6,662,163 B1 | 12/2003 | Albayrak et al. | 704/275 |
| 6,689,947 B2 | 2/2004 | Ludwig | 84/721 |
| 6,717,593 B1 | 4/2004 | Jennings | |
| 6,718,015 B1 * | 4/2004 | Berstis | 379/88.17 |
| 6,745,163 B1 * | 6/2004 | Brocious et al. | 704/260 |
| 6,757,655 B1 * | 6/2004 | Besling et al. | 704/270.1 |
| 6,785,649 B1 | 8/2004 | Hoory et al. | 704/235 |
| 6,785,653 B1 | 8/2004 | White et al. | |
| 6,944,592 B1 | 9/2005 | Pickering | |
| 6,965,864 B1 | 11/2005 | Thrift et al. | |
| 7,003,463 B1 | 2/2006 | Maes et al. | |
| 7,003,464 B2 | 2/2006 | Ferrans et al. | |
| 7,020,609 B2 | 3/2006 | Thrift et al. | |
| 7,020,841 B2 | 3/2006 | Dantzig et al. | |
| 7,028,306 B2 | 4/2006 | Boloker et al. | |
| 2001/0034603 A1 * | 10/2001 | Thrift et al. | 704/270.1 |
| 2002/0003547 A1 * | 1/2002 | Wang et al. | 345/727 |
| 2002/0009517 A1 | 1/2002 | Degady et al. | |
| 2002/0010584 A1 | 1/2002 | Schultz et al. | |
| 2002/0010715 A1 | 1/2002 | Chinn et al. | |
| 2002/0031756 A1 | 3/2002 | Holtz et al. | 434/362 |
| 2002/0035474 A1 | 3/2002 | Alpdemir | |
| 2002/0065652 A1 * | 5/2002 | Kushida et al. | 704/231 |
| 2002/0077823 A1 | 6/2002 | Fox et al. | 704/260 |
| 2002/0091518 A1 | 7/2002 | Baruch et al. | 704/231 |
| 2002/0107891 A1 * | 8/2002 | Leamon et al. | 707/513 |
| 2002/0113908 A1 | 8/2002 | Sprowson et al. | |
| 2002/0128845 A1 * | 9/2002 | Thomas et al. | 704/270.1 |
| 2002/0165719 A1 | 11/2002 | Wang et al. | |
| 2002/0169806 A1 | 11/2002 | Wang et al. | |
| 2002/0173961 A1 | 11/2002 | Guerra | 704/258 |
| 2002/0178008 A1 * | 11/2002 | Reynar | 704/272 |
| 2002/0198719 A1 | 12/2002 | Gergic et al. | |
| 2003/0088421 A1 | 5/2003 | Maes et al. | |
| 2003/0125944 A1 | 7/2003 | Wohlsen et al. | 704/246 |
| 2003/0171924 A1 | 9/2003 | Bi et al. | |
| 2003/0200080 A1 | 10/2003 | Galanes et al. | 704/200 |
| 2004/0078201 A1 | 4/2004 | Porter et al. | |
| 2004/0138890 A1 * | 7/2004 | Ferrans et al. | 704/270.1 |
| 2004/0230434 A1 | 11/2004 | Galanes et al. | |
| 2004/0230637 A1 | 11/2004 | Lecoueche et al. | |
| 2005/0135571 A1 * | 6/2005 | Bangalore et al. | 379/88.01 |

FOREIGN PATENT DOCUMENTS

| | | |
|---|---|---|
| EP | 0834862 | 4/1998 |
| EP | 0 872 827 | 10/1998 |
| EP | 1209662 A2 * | 5/2002 |
| WO | WO 00/05643 | 2/2000 |
| WO | WO 00/14728 | 3/2000 |
| WO | WO 01/26093 | 4/2001 |

OTHER PUBLICATIONS

JavaServer Pages™ Technology—Frequently Asked Questions, Sun Microsystems, Aug. 27, 1999.*

Script—Client-side Script, Web Design Group, May 13th, 1998.*

XML and XSL from servers to cell-phones, Ramin Firoozye and Ranbir Chawla, Sep. 2nd, 1998.*

Telephones, "http://www.fusionanomaly.net/telephones.html", Oct. 30, 2000.*

Hemphill C.T. and Thrift P.R.: "Surfing the Web by Voice" Proceedings ACM Multimedia, Nov. 1995, pp. 215-222.

Communication and European Search Report, dated Jul. 28, 2005.

VoiceXML Forum, Version 1.00, Mar. 7, 2000, pp. 1-101.

SpeechObjects Specification V1.0, W3C Note, Nov. 2000.

McTear, Michael F., "Spoken Dialogue Technology: Enabling the Conversational User Interface", ACM Computing Surveys (CSUR), Mar. 2002, vol. 34, Issue 1, pp. 90-169.

Capra, Robert, et al. "Posters & Demos: WebContext: Remote Access to Shared Context", Proceedings of the 2001 Workshop on Perceptive User Interfaces, Nov. 2001, pp. 1-9.

Lucas, Bruce, "VoiceXML for Web-based Distributed Conversational Applications", Communications of the ACM, vol. 43, Issue 9, Sep. 2000, pp. 53-57.

Mit et al., "Grammar Representation Requirements for Voice Makeup Languages", W3C Working Draft, Dec. 23, 1999.

Official Search Report of the Japanese Patent Office in counterpart foreign application No. 2002-132053 filed May 5, 2002.

Takahiro Nakano et al.: "Investigation on speech interface for form-based information retrieval services on the WWW", IPSJ SIG Notes, Japan, the Information Processing Society of Japan, vol. 99, No. 14, p. 1-6, (Feb. 6, 1999).

Official Notice of Final Decision of Rejection from the Japanese Patent Office in counterpart foreign application No. 2002-132053 filed May 7, 2002.

Japanese Patent Application Laid-open No. Hei 10-240493 Abstract only.

Japanese Patent Application Laid-open No. Hei 2001-42890 Abstract only.

Japanese Patent Application Laid-open No. Hei 11-110186 Abstract only.

US Patent and Trademark Office Action mailed Feb. 16, 2007 for U.S. Appl. No. 09/960,229, filed Sep. 20, 2001.

Synchronized Multimedia Modules Based Upon SMIL 1.0, W3C, downloaded from: http://www.w3.orgt/TR/NOTE-SYMM-modules, Feb. 1999, pp. 1-8.

* cited by examiner

```
<html>
<form id="get_card_info" method="post" action="http://payment.asp">
    <select name="card_type">
        <option value="amex">American Express</option>
        <option value="visa">Visa</option>
        <option value="ms">MasterCard</option>
    </select>
    <input type="text" name="card_num" width="30"
        onChange="handle()" />
    <input type="text" name="expiry_date" />
    <input type="submit" value="Submit" onClick="verify()" />
</form>
<script><![CDATA[
    function handle() {
        if (get_card_info.card_type.value == "amex") {
            if (get_card_info.card_num.length != 15)
                alert ("amex should have 15 digits");
        } else
            if (get_card_info.card_num.length != 16)
                alert ("visa and master should have 16 digits");
    }
    function verify() {
        var flag = window.confirm("submit the credit card info?");
        if (flag)
            get_card_info.submit();
    }
]]></script>
</html>
```

```
270     <html>
            <form id="get_card_info" method="post" action="http://payment.asp">
                <select name="card_type" onClick="talk(g_card_types)">
                    <option value="amex">American Express</option>
                    <option value="visa">Visa</option>                              —280
                    <option value="ms">MasterCard</option>
                </select>
                <reco id="g_card_types" onReco ="handle()" >
290 ————          < grammar   src ="./gram#card_types" />
                </reco>
                <input type="text" name="card_num" width="30"
                    onClick="talk(g_card_num)" />
                <reco id=" g_card_num " onReco  ="handle()" >               — 282
                  < grammar   src =" ./gram#digits" />
                </reco>
                <input type="text" name="expiry_date"
                    onClick="talk(g_expiry_date)" />
                <reco id="g_expiry_date " >                                 — 284
                  < grammar  src ="   ./gram#dates " />
                </reco>
                <input type="submit" value="Submit" onClick="verify()" />
            </form>
            <script><![CDATA[
                    function talk(gobj) {
                        gobj.activate();
272                 }
                    function handle() {
                        if (get_card_info.card_num != null)  {
                            if (get_card_info.card_type.value == "amex") {
                                if (get_card_info.card_num.length != 15)
                                    alert ("amex should have 15 digits");
                            } else
                                if (get_card_info.card_num.length != 16)
                                    alert ("visa and master should have 16 digits");
                        }
                    }
                    function verify() {
                        var flag = window.confirm("submit the credit card
                info?");
                        if (flag) {
                            get_card_info.submit();
                        }
                    }
            ]]>
            </script>
        </html>
```

FIG. 8

```
<body>
    <form id="get_card_info" method="post" action="http://payment.asp"
        onActivate="welcom()">
        <prompt id="p_welcome"> We now need your credit card </prompt>
        <prompt id="p_mumble"> I didn't understand you </prompt>
        <prompt id="p_card_type" bargein="true"> What credit card would you use? </prompt>
        <prompt id="p_card_num" bargein="true"> Please say the number </prompt>
        <prompt id="p_expiry_date" bargein="true"> What is the expiration date? </prompt>
        <prompt id="p_content">
            I have your <value select="card_type"/> <value select="card_num"/>
            with expiration date
            <value select="expiry_date"/>
        </prompt>
        <prompt id="p_confirm"> Is this correct? </prompt>
        <reco id="g_card_types"      onNoReco="mumble(this, 2)">
          onReco="_handle(this, card_type)" />
          <grammar src="./gram#card_types" />
        </reco>
        <reco id="g_card_num" onNoReco="mumble(this, 1)">
          onReco="_handle(this, card_num)" />
          <grammar src="./gram#digits" />
        </reco>
        <reco id="g_expiry_date" onNoReco="mumble(this, 1)">
          onReco="_handle(this, expiry_date)" audio="rao" />
          <grammar src="./gram#dates" />
        </reco>
        <reco id="confirmation"    onReco="confirmed(this)" />
          <grammar src="./gram#yesno" />
        </reco>
        <select name="card_type">
            <option value="amex"> American Express </option>
            <option value="visa"> Visa </option>
            <option value="ms"> MasterCard </option>
        </select>
        <input type="text" name="card_num" width="30" />
        <input type="text" name="expiry_date" />
        <input type="submit" value="Submit" />
    </form>
    <script><![CDATA[
        function welcome() {
          p_welcome.active();
          repeat = 0;
          checkFilled();
        }
        function mumble(gobj, maxprompts) {
          gobj.deactivate();
          p_mumble.active();
          checkFil led();
        }
```

```
function _handle() {
  handle();
  checkFilled();
}
function checkFilled() {
  if (card_type.value == "") {
        p_card_type.active();
        g_card_types.activate(); return;
  }
  if (card_num.value =="") {
        p_card_num.active(); g_card_num.acti    vate(); return;
  }
  if (expiry_date.value == "") {
        p_expiry_data.active(); g_expiry_date.activate(); return;
  }
  p_content.activate();
  p_confirm.activate();
  confirmation.activate();
} function confirmed(gobj) {
        if (gobj.recogRes.text == "yes")
              get_card_info.submit();
}
//
// user codes start here
//
function handle() { if (get_card_info.card_type == "amex") {
     if (get_card_info.card_num.length != 15) {
        prompt.speak ("amex should have 15 digits");
        get_card_info.card_num = "";
     }
  } else
     if (get_card_info.card_num.length != 16) {
        prompt.speak ('visa and master should have 16 digits");
        get_card_info.card_num = "";
     }
}
]]>
</script>
</body>
```

FIG. 9B

```
<body>
    <form id="get_card_info" method="post" action="http://payment.asp"
        onactivate="welcome()">
        <prompt id="p_welcome">We now need your credit card</prompt>
        <prompt id="p_mumble">I didn't understand you</prompt>
        <prompt id="p_card_type" bargein="true">What credit card would you
use?</prompt>
        <prompt id="p_card_num" bargein="true">Please say the number</prompt>
        <prompt id="p_expiry_date" bargein="true">What is the expiration
date?</prompt>
        <prompt id="p_content">
           I have your  <value select="card_type" /><value select="card_num" />
    with expiration date <value select="expiry_date" />
        </prompt>
        <prompt id="p_confirm">Is this correct?</prompt>
        <reco id="g_get_card_info" onReco="_handle()"  onNoReco ="mumble(this)">
           <grammar    src   ="./gram/getPayment" />
           <bind target="card_type" value="/card/type" />
405 ──    <bind target="card_num" value="/card/number" />
           <bind target="expiry_date" value="/card/expr_date" />
        </reco>
        <reco id="confirmation" onReco ="confirmed(this)  onNoReco ="mumble(this)" />
           <grammar src ="./gram#yesno"/>
        </reco>
        <select name="card_type">
           <option value="amex">American Express</option>
           <option value="visa">Visa</option>
           <option value="ms">MasterCard</option>
        </select>
        <input type="text" name="card_num" width="30" />
        <input type="text" name="expiry_date" />
        <input type="submit" value="Submit" />
    </form>
    <script><![CDATA[
        function welcome() {
          p_welcome.active();
          repeat = 0;
          checkFilled();
        }
        function mumble(gobj) {
          gobj.deactivate();
          p_mumble.active();
          checkFilled();
        }
        function _handle() {
          handle();
          checkFilled();
        }
```

```
function checkFilled()   {
  if (card_type.value == "") {
        p_card_type.active();; do_field.activate(); return;
  }
  if (card_num.value =="") {
        p_card_num.active(); do_field.activate(); return;
  }
  if (expiry_date.value == "") {
        p_expiry_data.active(); do_field.activate(); return;
  }
  p_content.activate();
  p_confirm.activate();
  confirmation.activate();
}
function confirmed(gobj) {
  if (gobj.recogRes.text == "yes")
        get_card_info.submit(gensml());
}
//
// user codes start here
//
function handle() {
  if (field == get_card_info.card_num) {
     if (get_card_info.card_num.length != 15) {
        prompt.speak ("amex should have 15 digits");
        get_card_info.card_num = "";
     }
  } else
     if (get_card_info.card_num.length != 16)  {
        prompt.speak ("visa should have 15 digits");
        get_card_info.card_num = "";
     }
}
function gensml() {
        str = '<sml><credit_card type="';
        str += card_type.value; str += '"><number>';
        str += card_number.value; str += '</number><expire>';
        str += expiry_date.value; str +=
'</expire></credit_card></sml>';
        return str;
}
    ]]>
  </script>
</body>
```

*FIG. 10B*

SAMPLE ASP+ PAGE

```
<%@ Page language="Jscript" AutoEventWireup="false" Inherits="Credit.Transaction" %>
<html><head>
<!-- ASPX page for both voice-only & multimodal credit card example -->
<script>
function handle() {
        if (field == get_card_info.card_num) {
           if (get_card_info.card_num.length != 15) {
             prompt.speak ("amex should have 15 digits");
             get_card_info.card_num = "";
           }
        } else
           if (get_card_info.card_num.length != 16)  {
             prompt.speak ("visa should have 15 digits");
             get_card_info.card_num = "";
           }
      }
function gensml() {
      str = '<sml><credit_card><card_type>';
      str += card_type.value; str += '</card_type><number>';
      str += card_number.value; str += '</number><expire>';
      str += expiry_date.value; str += '</expire></credit_card></sml>';
      return str;
}
</script>
<script runat="server">
function Page_Load (obj, args) {
      if (PostBack) {
         validator = new System.Speech.SMLValidator("./CreditSDL.xml");
         dsml = validator.Evaluate(args);
         Navigate(ChoosePage(dsml));
      } else {
         // initialize fields with args
      }
}
</script>
</head>
<body>
<speech:form id="get_card_info" style="system_initiative"
      prompt="./prompt/getPayment" onsubmit="gensml()">
  <speech:choice name="card_type" prompt="What credit card would you use?"
      grammar="./gram#card_types" onPhraseFinish="handle()"
      <option>American Express</option>
      <option>Visa</option>
      <option>Mastercard </option>
  </speech:choice>
  <speech:textbox name="card_number" prompt="Please say the number"
      grammar="./gram#digits" onPhraseFinish="handle()">
  <speech:textbox name="expiry_date" prompt="What is the expiration date? "
      grammar="./gram#dates" onPhraseFinish="handle()"/>

</speech:form>
</body>
</html>
```

FIG. 11

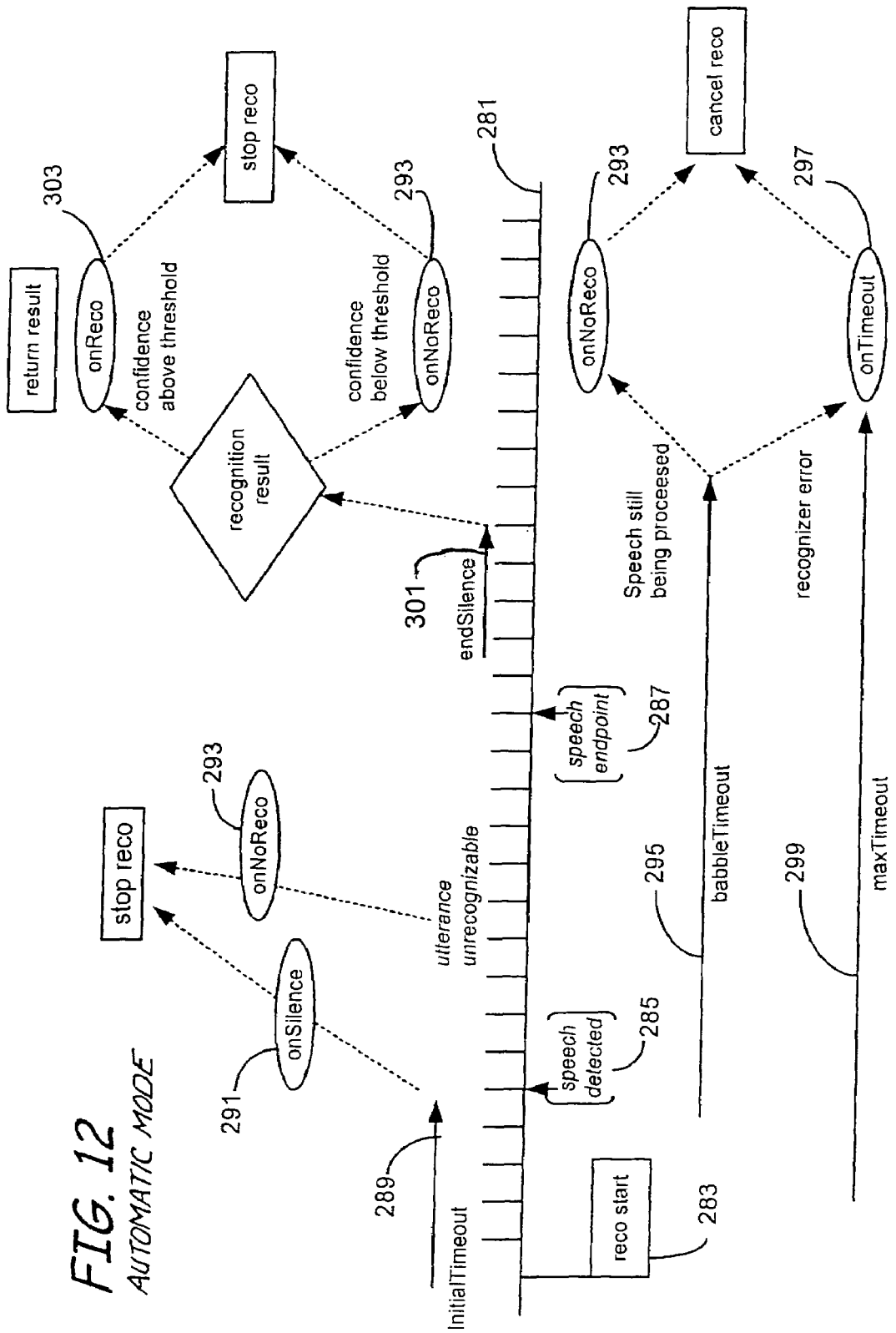
FIG. 12 AUTOMATIC MODE

SINGLE MODE

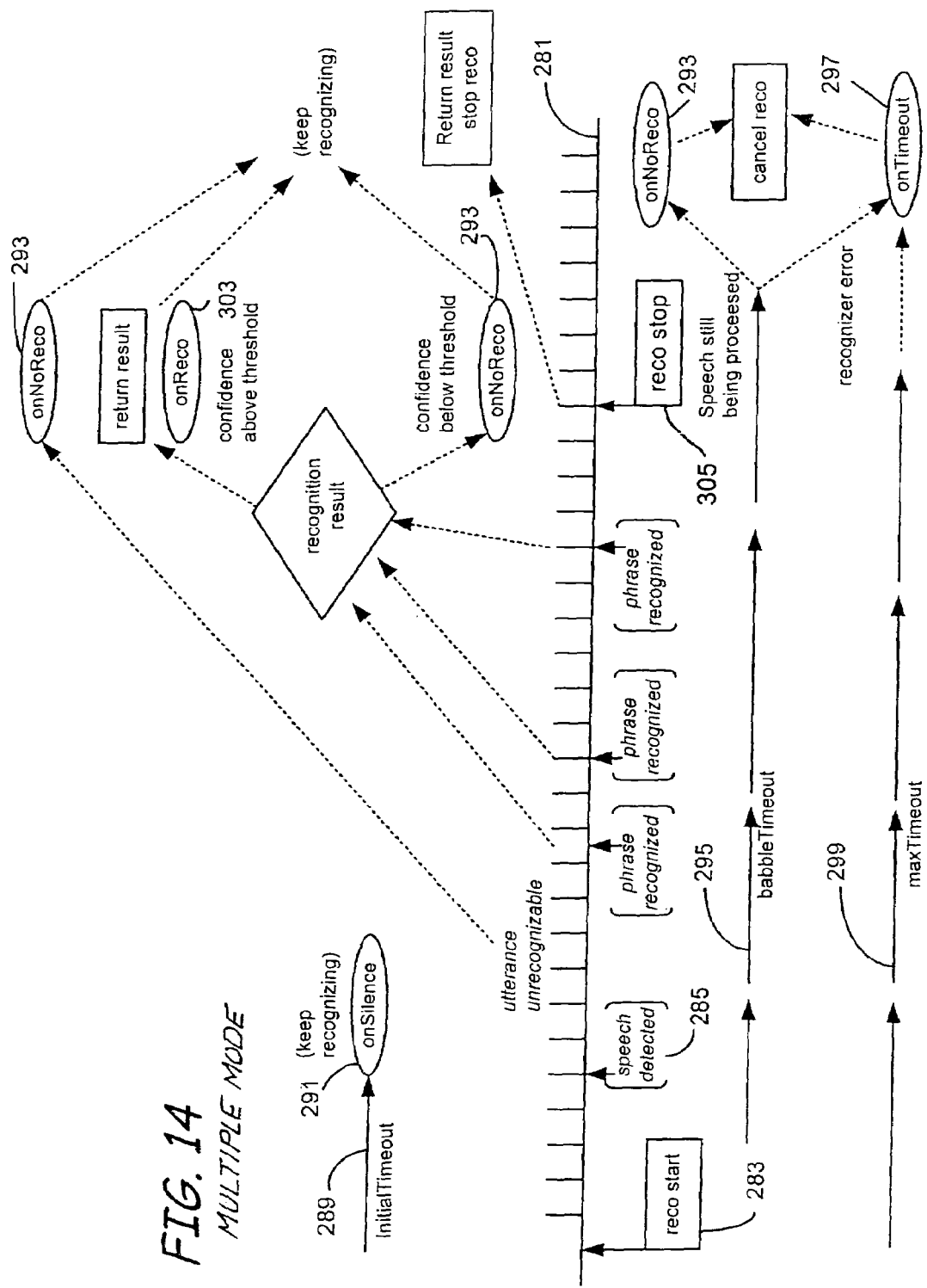
FIG. 14 MULTIPLE MODE

WEB ENABLED RECOGNITION ARCHITECTURE

CROSS-REFERENCE TO RELATED APPLICATION

This application claims the benefit of U.S. provisional patent application 60/289,041, filed May 4, 2001.

BACKGROUND OF THE INVENTION

The present invention relates to access of information over a wide area network such as the Internet. More particularly, the present invention relates to web enabled recognition allowing information and control on a client side to be entered using a variety of methods.

Small computing devices such as personal information managers (PIM), devices and portable phones are used with ever increasing frequency by people in their day-to-day activities. With the increase in processing power now available for microprocessors used to run these devices, the functionality of these devices are increasing, and in some cases, merging. For instance, many portable phones now can be used to access and browse the Internet as well as can be used to store personal information such as addresses, phone numbers and the like.

In view that these computing devices are being used for browsing the Internet, or are used in other server/client architectures, it is therefore necessary to enter information into the computing device. Unfortunately, due to the desire to keep these devices as small as possible in order that they are easily carried, conventional keyboards having all the letters of the alphabet as isolated buttons are usually not possible due to the limited surface area available on the housings of the computing devices.

Recently, voice portals such as through the use of VoiceXML (voice extensible markup language) have been advanced to allow Internet content to be accessed using only a telephone. In this architecture, a document server (for example, a web server) processes requests from a client through a VoiceXML interpreter. The web server can produce VoiceXML documents in reply, which are processed by the VoiceXML interpreter and rendered audibly to the user. Using voice commands through voice recognition, the user can navigate the web.

VoiceXML is a markup language with flow control tags; however, flow control does not follow the HTML (Hyper Text Markup Language) flow control model, which includes eventing and separate scripts. Rather, VoiceXML generally includes a form interpretation algorithm that is particularly suited for telephone-based voice-only interaction, and commonly, where the information obtained from the user is under the control of the system or application. Incorporation of VoiceXML directly into applications available in a client-server relationship where graphically user interfaces are also provided will require the developer to master two forms of web authoring, one for VoiceXML and the other using HTML (or the like), each one following a different flow control model.

There is thus an ongoing need to improve upon the architecture, or parts thereof, and methods used to provide speech recognition in a server/client architecture such as the Internet. The authoring tool for speech recognition should be easily adaptable to small computing devices such as PIMs, telephones and the like. An architecture or method of web authoring that addresses one, several or all of the foregoing disadvantages is particularly needed. An architecture that allows other methods of input would also be beneficial.

SUMMARY OF THE INVENTION

A server/client system for processing data includes a network having a web server with information accessible remotely. A client device includes a microphone and a rendering component such as a speaker or display. The client device is configured to obtain the information from the web server and record input data associated with fields contained in the information. The client device is adapted to send the input data to a remote location with an indication of a grammar to use for recognition. A recognition server receives the input data and the indication of the grammar. The recognition server returns data indicative of what was inputted to at least one of the client and the web server.

BRIEF DESCRIPTION OF THE DRAWINGS

FIG. 7 is a page of mark-up language executable on a client.

FIG. 8 is an exemplary page of mark-up language executable on a client having a display and voice recognition capabilities.

FIGS. 9A and 9B are an exemplary page of mark-up language executable on a client with audible rendering only and system initiative.

FIGS. 10A and 10B are an exemplary page of mark-up language executable on a client with audible rendering only and mixed initiative.

FIG. 11 is an exemplary script executable by a server side plug-in module.

FIG. 12 is a pictorial illustration of a first operational mode of a recognition server.

FIG. 14 is a pictorial illustration of a third operational mode of the recognition server.

DETAILED DESCRIPTION OF THE ILLUSTRATIVE EMBODIMENTS

Figure 1:
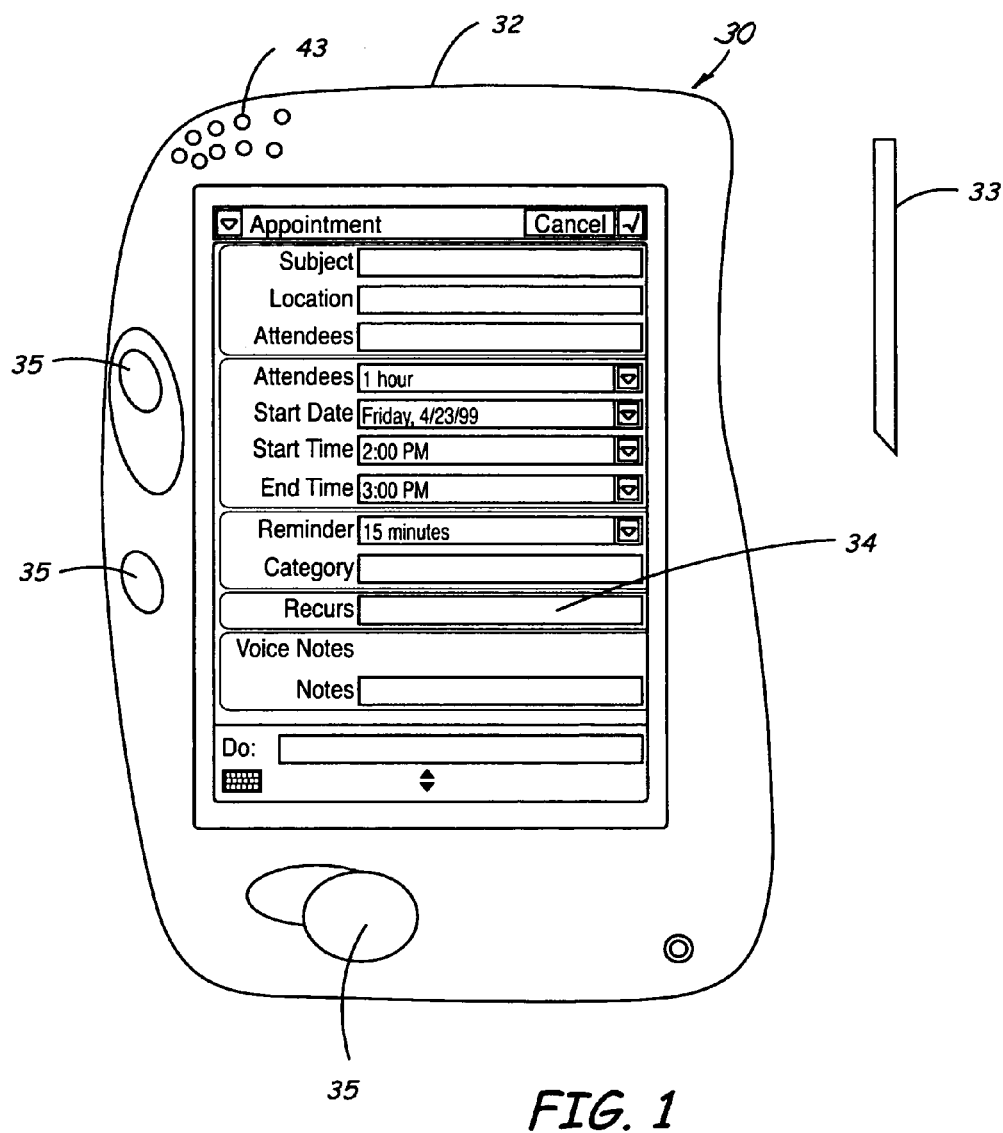
FIG. 1 is a plan view of a first embodiment of a computing device operating environment.

Before describing an architecture of web based recognition and methods for implementing the same, it may be useful to describe generally computing devices that can function in the architecture. Referring now to FIG. 1, an exemplary form of a data management device (PIM, PDA or the like) is illustrated at 30. However, it is contemplated that the present invention can also be practiced using other computing devices discussed below, and in particular, those computing devices having limited surface areas for input buttons or the like. For example, phones and/or data management devices will also benefit from the present invention. Such devices will have an enhanced utility compared to existing portable personal information management devices and other portable electronic devices, and the functions and compact size of such devices will more likely encourage the user to carry the device at all times. Accordingly, it is not intended that the scope of the architecture herein described be limited by the disclosure of an exemplary data management or PIM device, phone or computer herein illustrated.

An exemplary form of a data management mobile device 30 is illustrated in FIG. 1. The mobile device 30 includes a housing 32 and has an user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the invention is not intended to be limited by these forms of input mechanisms. For instance, another form of input can include a visual input such as through computer vision.

Figure 2:
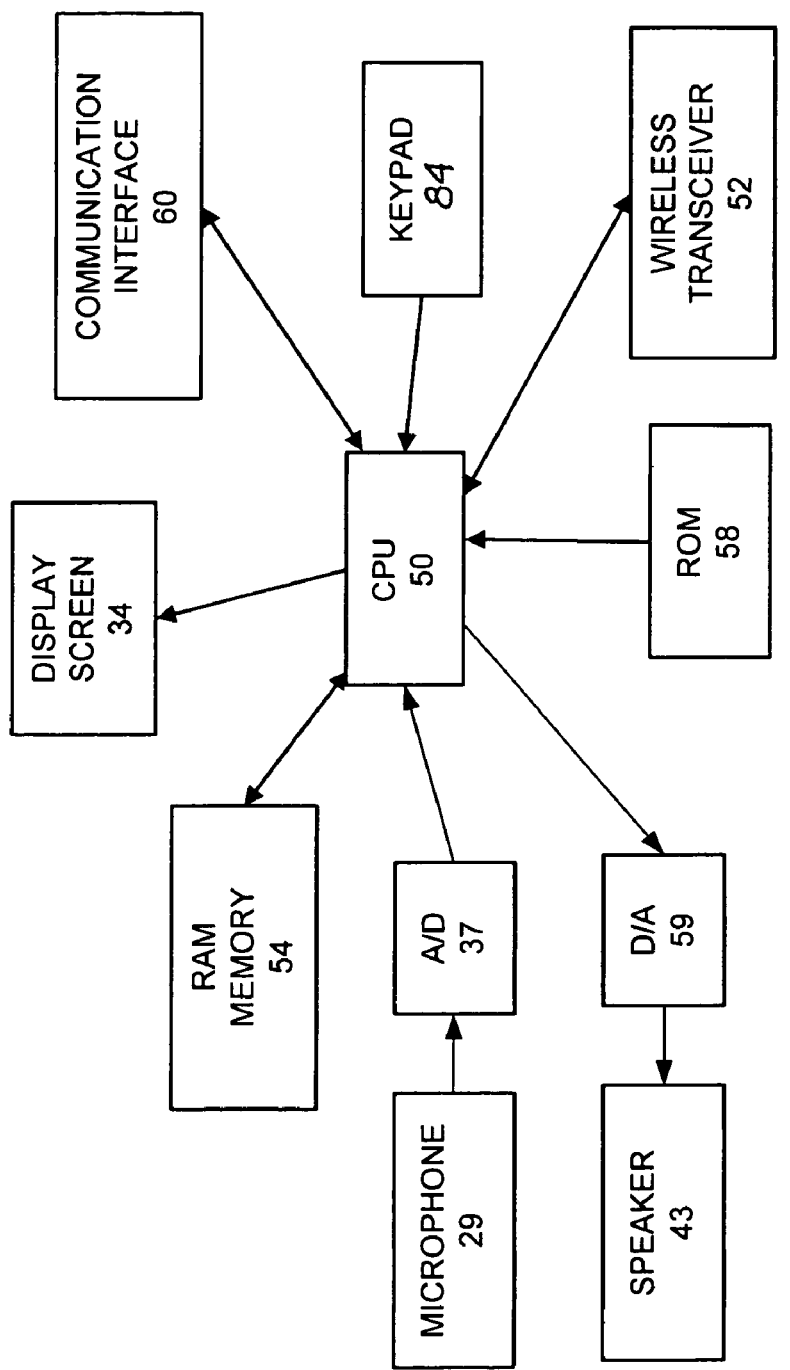
FIG. 2 is a block diagram of the computing device of FIG. 1.

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54).

RAM 54 also serves as a storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Figure 3:
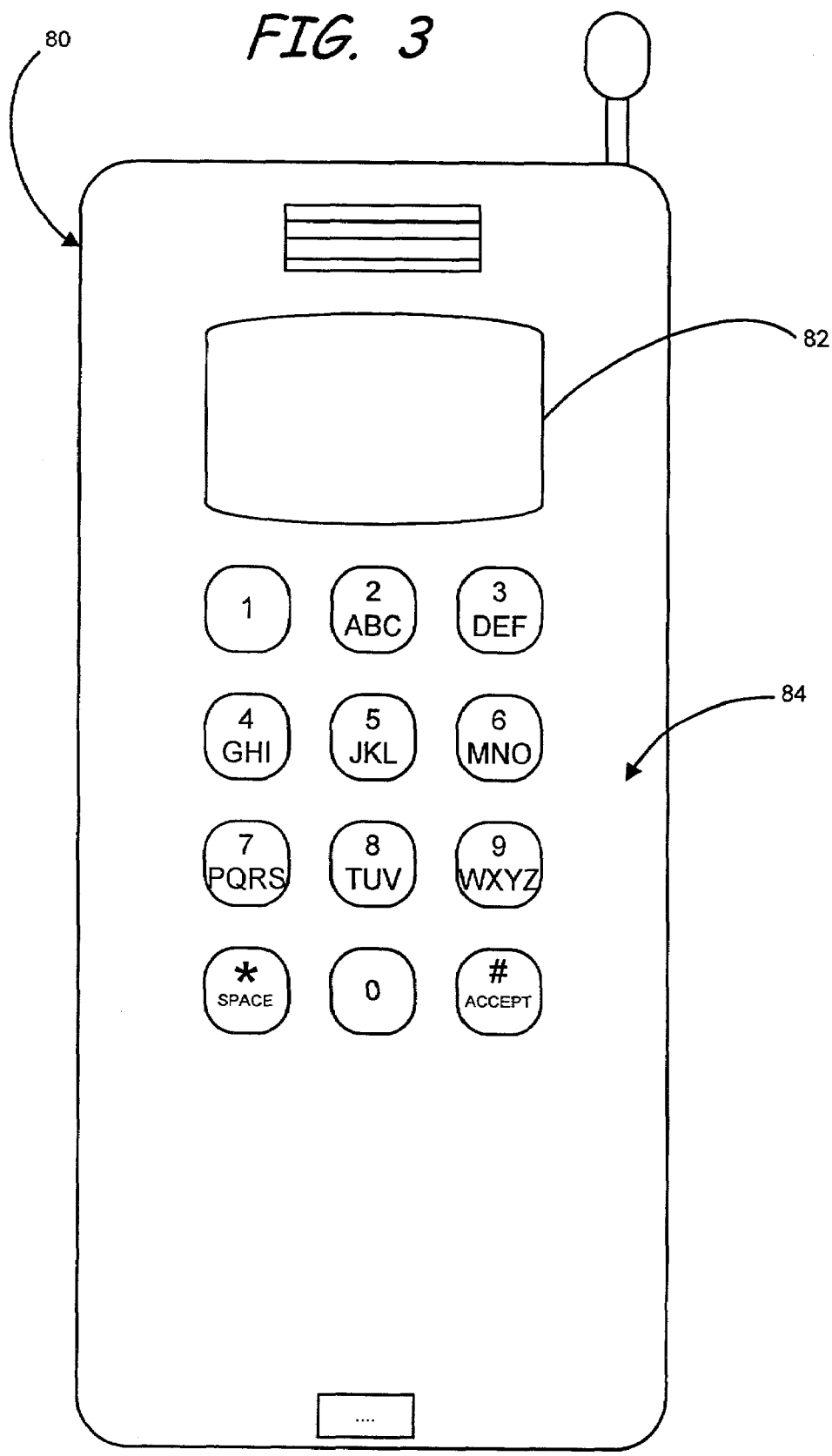
FIG. 3 is a plan view of a telephone.

Mobile device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results. Using wireless transceiver 52 or communication interface 60, speech data is transmitted to a remote recognition server 204 discussed below and illustrated in the architecture of FIG. 5. Recognition results are then returned to mobile device 30 for rendering (e.g. visual and/or audible) thereon, and eventual transmission to a web server 202 (FIG. 5), wherein the web server 202 and mobile device 30 operate in a client/server relationship. Similar processing can be used for other forms of input. For example, handwriting input can be digitized with or without pre-processing on device 30. Like the speech data, this form of input can be transmitted to the recognition server 204 for recognition wherein the recognition results are returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input. FIG. 3 is a plan view of an exemplary embodiment of a portable phone 80. The phone 80 includes a display 82 and a keypad 84. Generally, the block diagram of FIG. 2 applies to the phone of FIG. 3, although additional circuitry necessary to perform other functions may be required. For instance, a transceiver necessary to operate as a phone will be required for the embodiment of FIG. 2; however, such circuitry is not pertinent to the present invention.

In addition to the portable or mobile computing devices described above, it should also be understood that the present invention can be used with numerous other computing devices such as a general desktop computer. For instance, the present invention will allow a user with limited physical abilities to input or enter text into a computer or other computing device, when other conventional input devices, such as a full alpha-numeric keyboard, are too difficult to operate.

The invention is also operational with numerous other general purpose or special purpose computing systems, environments or configurations. Examples of well known computing systems, environments, and/or configurations that may be suitable for use with the invention include, but are not limited to, regular telephones (without any screen) personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 4:
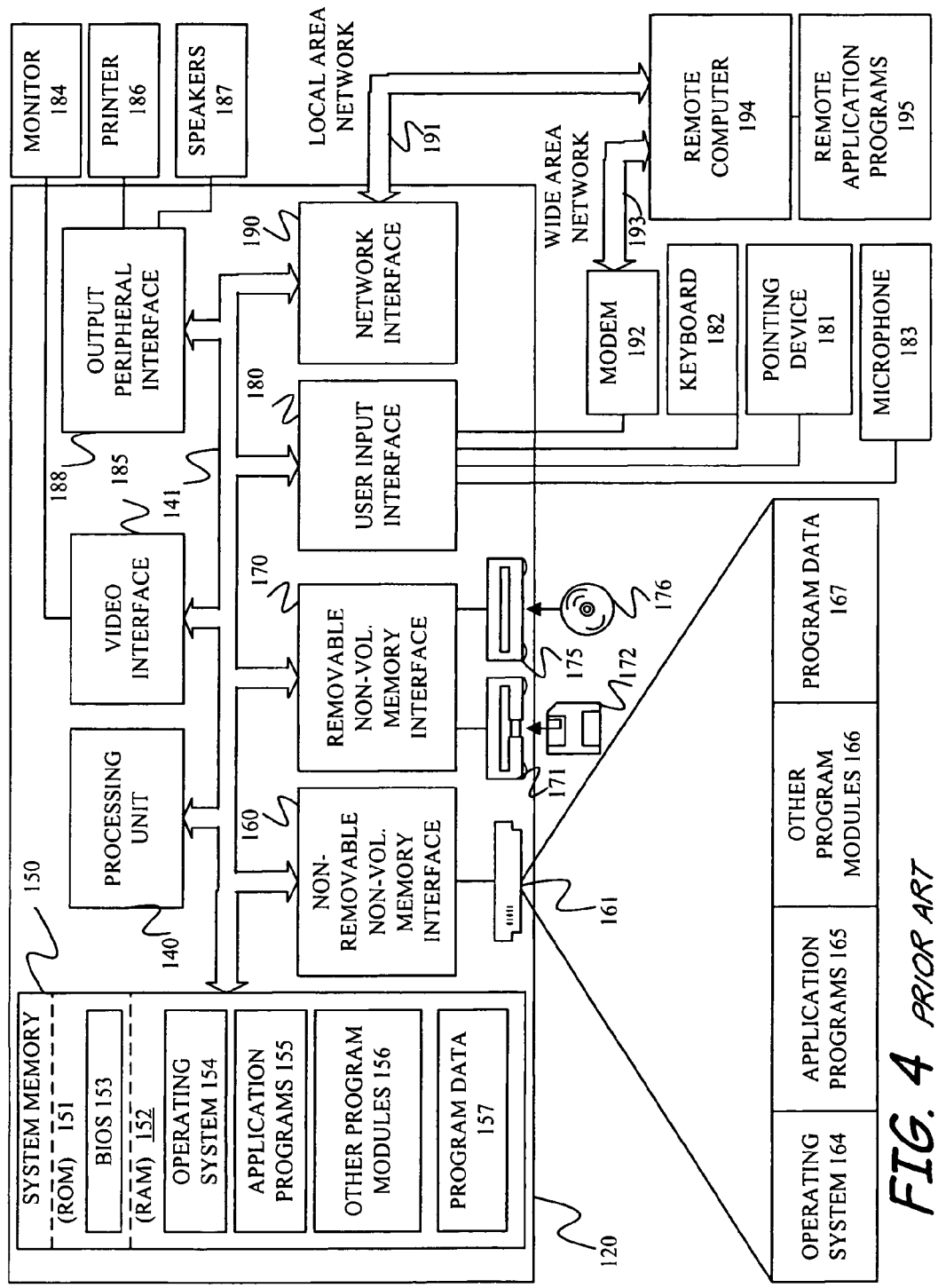
FIG. 4 is a block diagram of a general purpose computer.

The following is a brief description of a general purpose computer 120 illustrated in FIG. 4. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 4, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 4 illustrates operating system 54, application programs 155, other program modules 156, and program data 157.

The computer 120 may also include other removable/non-removable volatile/nonvolatile computer storage media. By way of example only, FIG. 4 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 4, provide storage of computer readable instructions, data structures, program modules and other data for the computer 120. In FIG. 4, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 4 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 4 illustrates remote application programs 195 as residing on remote computer 194. It will be appreciated that the network connections shown are exemplary and other means of establishing a communications link between the computers may be used.

Figure 5:
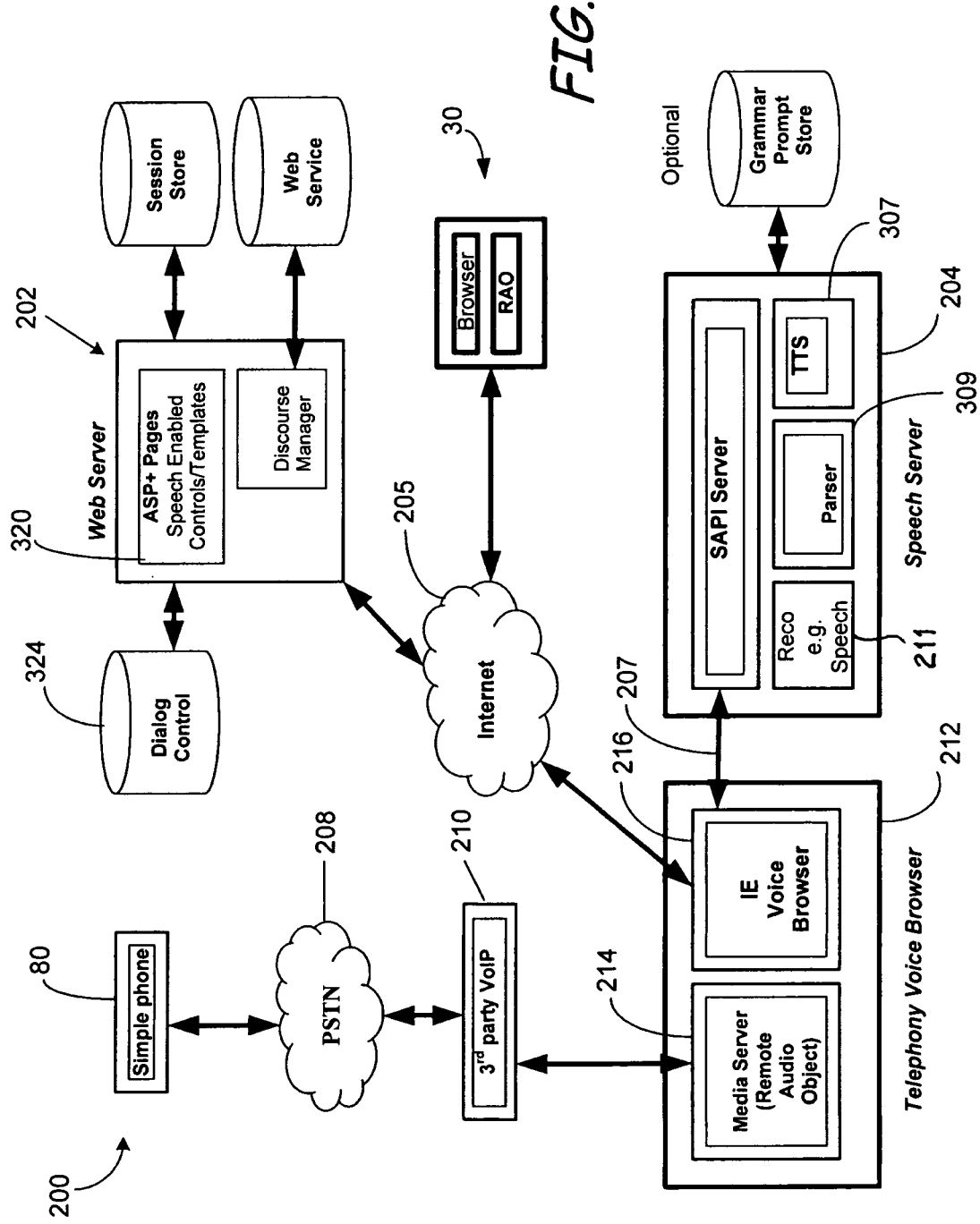
FIG. 5 is a block diagram of an architecture for a client/server system.

FIG. 5 illustrates architecture 200 for web based recognition as can be embodied in the present invention. Generally, information stored in a web server 202 can be accessed through mobile device 30 (which herein also represents other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

More importantly though, architecture 200 is unified in that whether information is obtained through device 30 or phone 80 using speech recognition, a single recognition server 204 can support either mode of operation. In addition, architecture 200 operates using an extension of well-known mark-up languages (e.g. HTML, XHTML, cHTML, XML, WML, and the like). Thus, information stored on web server 202 can also be accessed using well-known GUI methods found in these mark-up languages. By using an extension of well-known mark-up languages, authoring on the web server 202 is easier, and legacy applications currently existing can be also easily modified to include voice recognition.

Generally, device 30 executes HTML+ scripts, or the like, provided by web server 202. When voice recognition is required, by way of example, speech data, which can be digitized audio signals or speech features wherein the audio signals have been preprocessed by device 30 as discussed above, are provided to recognition server 204 with an indication of a grammar or language model to use during speech recognition. The implementation of the recognition server 204 can take many forms, one of which is illustrated, but generally includes a recognizer 211. The results of recognition are provided back to device 30 for local rendering if desired or appropriate. Upon compilation of information through recognition and any graphical user interface if used, device 30 sends the information to web server 202 for further processing and receipt of further HTML scripts, if necessary.

As illustrated in FIG. 5, device 30, web server 202 and recognition server 204 are commonly connected, and separately addressable, through a network 205, herein a wide area network such as the Internet. It therefore is not necessary that any of these devices be physically located adjacent each other. In particular, it is not necessary that web server 202 includes recognition server 204. In this manner, authoring at web server 202 can be focused on the application to which it is intended without the authors needing to know the intricacies of recognition server 204. Rather, recognition server 204 can be independently designed and connected to the network 205, and thereby, be updated and improved without further changes required at web server 202. As discussed below, web server 202 can also include an authoring mechanism that can dynamically generate client-side markups and scripts. In a further embodiment, the web server 202, recognition server 204 and client 30 may be combined depending on the capabilities of the implementing machines. For instance, if the client comprises a general purpose computer, e.g. a personal computer, the client may include the recognition server 204. Likewise, if desired, the web server 202 and recognition server 204 can be incorporated into a single machine.

With respect to the client device, a method for processing input data in a client/server system includes receiving from a server a markup language page having extensions configured to obtain input data from a user of a client device; executing the markup language page on the client device; transmitting input data (indicative of speech, DTMF, handwriting, gestures or images obtained from the user) and an associated grammar to a recognition server remote from the client; and receiving a recognition result from the recognition server at the client. A computer readable medium can be provided having a markup language for execution on a client device in a client/server system, the markup language having an instruction indicating a grammar to associate with input data entered through the client device.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephone voice browser 212 includes a media server 214 that provides a telephony interface and a voice browser 216. Like device 30, telephony voice browser 212 receives HTML scripts or the like from web server 202. More importantly though, the HTML scripts are of the form similar to HTML scripts provided to device 30. In this manner, web server 202 need not support device 30 and phone 80 separately, or even support standard GUI clients separately. Rather, a common mark-up language can be used. In addition, like device 30, voice recognition from audible signals transmitted by phone 80 are provided from voice browser 216 to recognition server 204, either through the network 205, or through a dedicated line 207, for example, using TCP/IP. Web server 202, recognition server 204 and telephone voice browser 212 can be embodied in any suitable computing environment such as the general purpose desktop computer illustrated in FIG. 4.

However, it should be noted that if DTMF recognition is employed, this form of recognition would generally be performed at the media server 214, rather than at the recognition server 204. In other words, the DTMF grammar would be used by the media server.

The mark-up languages such as HTML, XHTML cHTML, XML, WML or with any other SGML-derived markup can include controls and/or objects that provide recognition in a client/server architecture. In this manner, authors can leverage all the tools and expertise in these mark-up languages that are the predominant web development platform used in such architectures.

Generally, controls and/or objects can include one or more of the following functions: recognizer controls and/or objects for recognizer configuration, recognizer execution and/or post-processing; synthesizer controls and/or objects for synthesizer configuration and prompt playing; grammar controls and/or objects for specifying input grammar resources; and/or binding controls and/or objects for processing recognition results. The extensions are designed to be a lightweight markup layer, which adds the power of an audible, visual, handwriting, etc. interface to existing markup languages. As such, the extensions can remain independent of: the high-level page in which they are contained, e.g. HTML; the low-level formats which the extensions used to refer to linguistic resources, e.g. the text-to-speech and grammar formats; and the individual properties of the recognition and speech synthesis platforms used in the recognition server 204.

Figure 6:
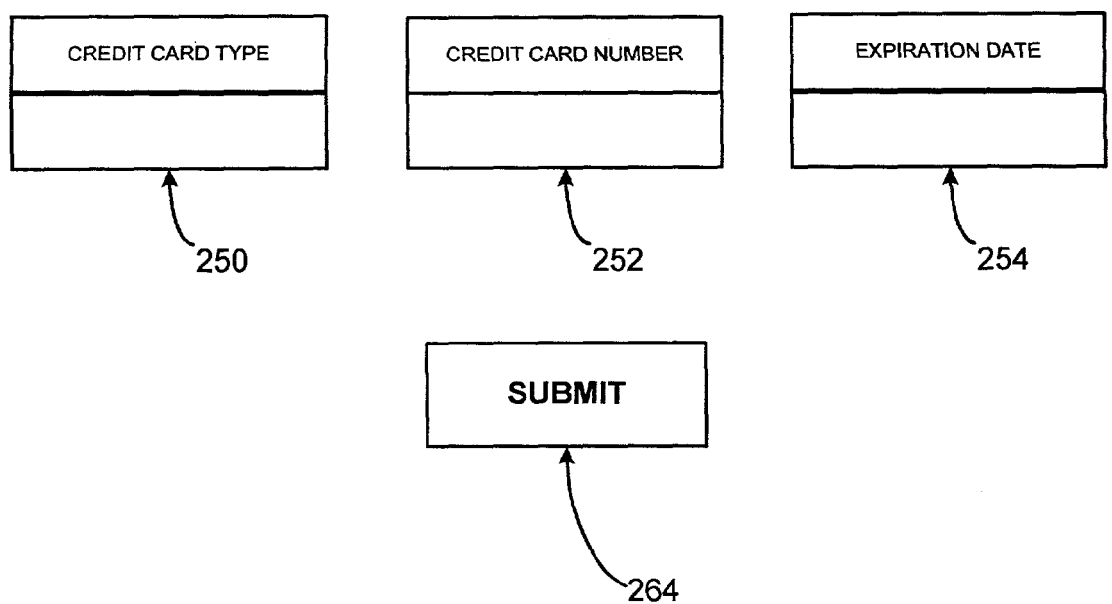
FIG. 6 is a display for obtaining credit card information.

Before describing mark-up languages having controls and/or objects suited for recognition, it may be helpful to examine a simple GUI example herein embodied with the HTML mark-up language. Referring to FIG. 6, a simple GUI interface comprises submission of credit card information to the web server to complete an on-line sale. In this example, the credit card information includes a field 250 for entry of the type of credit card being used, for example, Visa, MasterCard or American Express. A second field 252 allows entry of the credit card number, while a third field 254 allows entry of the expiration date. Submit button 264 is provided to transmit the information entered in fields 250, 252 and 254.

FIG. 7 illustrates the HTML code for obtaining the foregoing credit card information from the client. Generally, as is common in these forms of mark-up languages, the code includes a body portion 260 and a script portion 262. The body portion 260 includes lines of code indicating the type of action to be performed, the form to use, the various fields of information 250, 252 and 254, as well as a code for submit button 264 (FIG. 6). This example also illustrates eventing support and embedded script hosting, wherein upon activation of the submit button 264, a function "verify" is called or executed in script portion 262. The "verify" function ascertains whether the card number length for each of the credit cards (Visa, MasterCard and American Express) is of the proper length.

FIG. 8 illustrates a client markup that generates the same GUI of FIG. 6 for obtaining credit card information to be provided to web server 204 using speech recognition. Although speech recognition will be discussed below with respect to FIGS. 8-14, it should be understood that the techniques described can be similarly applied in handwriting recognition, gesture recognition and image recognition.

Generally, the extensions (also commonly known as "tags") are a small set of XML elements, with associated attributes and DOM object properties, events and methods, which may be used in conjunction with a source markup document to apply a recognition interface, DTMF or call control to a source page. The extensions formalities and semantics are independent of the nature of the source document, so the extensions can be used equally effectively within HTML, XHTML, cHTML, XML, WML, or with any other SGML-derived markup. The extension follow the document object model wherein new functional objects or elements, which can be hierarchical, are provided. Each of the elements are discussed in detail in the Appendix, but generally the elements can include attributes, properties, methods, events and/or other "child" elements.

At this point, it should also be noted that the extensions may be interpreted in two different "modes" according to the capabilities of the device upon which the browser is being executed on. In a first mode, "object mode", the full capabilities are available. The programmatic manipulation of the extensions by an application is performed by whatever mechanisms are enabled by the browser on the device, e.g. a JScript interpreter in an XHTML browser, or a WMLScript interpreter in a WML browser. For this reason, only a small set of core properties and methods of the extensions need to be defined, and these manipulated by whatever programmatic mechanisms exist on the device or client side. The object mode provides eventing and scripting and can offer greater functionality to give the dialog author a much finer client-side control over speech interactions. As used herein, a browser that supports full event and scripting is called an "uplevel browser". This form of a browser will support all the attributes, properties, methods and events of the extensions. Uplevel browsers are commonly found on devices with greater processing capabilities.

The extensions can also be supported in a "declarative mode". As used herein, a browser operating in a declarative mode is called a "downlevel browser" and does not support full eventing and scripting capabilities. Rather, this form of browser will support the declarative aspects of a given extension (i.e. the core element and attributes), but not all the DOM (document object model) object properties, methods and events. This mode employs exclusively declarative syntax, and may further be used in conjunction with declarative multimedia synchronization and coordination mechanisms (synchronized markup language) such as SMIL (Synchronized Multimedia Integration Language) 2.0. Downlevel browsers will typically be found on devices with limited processing capabilities.

At this point though; a particular mode of entry should be discussed. In particular, use of speech recognition in conjunction with at least a display and, in a further embodiment, a pointing device as well to indicate the fields for data entry is particularly useful. Specifically, in this mode of data entry, the user is generally under control of when to select a field and provide corresponding information. For instance, in the example of FIG. 6, a user could first decide to enter the credit card number in field 252 and then enter the type of credit card in field 250 followed by the expiration date in field 254. Likewise, the user could return back to field 252 and correct an errant entry, if desired. When combined with speech recognition as described below, an easy and natural form of navigation is provided. As used herein, this form of entry using both a screen display allowing free form selection of fields and voice recognition is called "multi-modal".

Referring back to FIG. 8, HTML mark-up language code is illustrated. Like the HTML code illustrated in FIG. 7, this code also includes a body portion 270 and a script portion 272. Also like the code illustrated in FIG. 7, the code illustrated in FIG. 8 includes indications as to the type of action to perform as well as the location of the form. Entry of information in each of the fields 250, 252 and 254 is controlled or executed by code portions 280, 282 and 284, respectively. Referring first to code portion 280, on selection of field 250, for example, by use of stylus 33 of device 30, the event "onClick" is initiated which calls or executes function "talk" in script portion 272. This action activates a grammar used for speech recognition that is associated with the type of data generally expected in field 250. This type of interaction, which involves more than one technique of input (e.g. voice and pen-click/roller) is referred as "multimodal".

It should be noted that the speech recognition extensions exemplified in FIG. 8 are not intended to have a default visual representation on the browser of the client, since for many applications it is assumed that the author will signal the speech enablement of the various components of the page by using application-specification graphical mechanisms in the source page. Nevertheless, if visual representations are desired, the extensions can so be modified.

Referring now back to the grammar, the grammar is a syntactic grammar such as but not limited to a context-free grammar, a N-grammar or a hybrid grammar. (Of course, DTMF grammars, handwriting grammars, gesture grammars and image grammars would be used when corresponding forms of recognition are employed. As used herein, a "grammar" includes information for performing recognition, and in a further embodiment, information corresponding to expected input to be entered, for example, in a specific field) A new control 290 (herein identified as "reco"), comprising a first extension of the mark-up language, includes various elements, two of which are illustrated, namely a grammar element "grammar" and a "bind" element. Generally, like the code downloaded to a client from web server 202, the grammars can originate at web server 202 and be downloaded to the client and/or forwarded to a remote server for speech processing. The grammars can then be stored locally thereon in a cache. Eventually, the grammars are provided to the recognition server 204 for use in recognition. The grammar element is used to specify grammars, either inline or referenced using an attribute.

Upon receipt of recognition results from recognition server 204 corresponding to the recognized speech, handwriting, gesture, image, etc., syntax of reco control 290 is provided to receive the corresponding results and associate it with the corresponding field, which can include rendering of the text therein on display 34. In the illustrated embodiment, upon completion of speech recognition with the result sent back to the client, it deactivates the reco object and associates the recognized text with the corresponding field. Portions 282 and 284 operate similarly wherein unique reco objects and grammars are called for each of the fields 252 and 254 and upon receipt of the recognized text is associated with each of the fields 252 and 254. With respect to receipt of the card number field 252, the function "handle" checks the length of the card number with respect to the card type in a manner similar to that described above with respect to FIG. 7.

Generally, use of speech recognition in conjunction with architecture 200 and the client side mark-up language occurs as follows: first, the field that is associated with the speech to be given is indicated. In the illustrated embodiment, the stylus 33 is used; however, it should be understood that the present invention is not limited to use of the stylus 33 wherein any form of indication can be used such as buttons, a mouse pointer, rotatable wheels or the like. Corresponding event such as "onClick" can be provided as is well known with use of visual mark-up languages. It should be understood that the present invention is not limited to the use of the "onClick" event to indicate the start of voice, handwriting, gesture, etc commands. Any available GUI event can be used for the same purpose as well, such as "onSelect'. In one embodiment, such eventing is particularly useful for it serves to indicate both the beginning and/or end of the corresponding speech. It should also be noted that the field for which the speech is directed at can be indicated by the user as well as programs running on the browser that keep track of user interactions.

At this point, it should be stated that different scenarios of speech recognition require different behaviors and/or outputs from recognition server 204. Although the starting of the recognition process is standard in all cases—an explicit start ( ) call from uplevel browsers, or a declarative <reco> element in downlevel browsers—the means for stopping speech recognition may differ.

In the example above, a user in a multimodal application will control input into the device by, for example, tapping and holding on a pressure sensitive display. The browser then uses a GUI event, e.g. "pen-up", to control when recognition should stop and then returns the corresponding results. However, in a voice-only scenario such as in a telephone application (discussed below) or in a hands-free application, the user has no direct control over the browser, and the recognition server 204 or the client 30, must take the responsibility of deciding when to stop recognition and return the results (typically once a path through the grammar has been recognized). Further, dictation and other scenarios where intermediate results need to be returned before recognition is stopped (also known as "open microphone") not only requires an explicit stop function, but also needs to return multiple recognition results to the client 30 and/or web server 202 before the recognition process is stopped.

In one embodiment, the Reco element can include a "mode" attribute to distinguish the following three modes of recognition, which instruct the recognition server 204 how and when to return results. The return of results implies providing the "onReco" event or activating the "bind" elements as appropriate. In one embodiment, if the mode is unspecified, the default recognition mode can be "automatic".

FIG. 12 is a pictorial representation of operation of the "automatic" mode for speech recognition (similar modes, events, etc. can be provided for other forms of recognition). A timeline 281 indicates when the recognition server 204 is directed to begin recognition at 283, and where the recognition server 204 detects speech at 285 and determines that speech has ended at 287.

Various attributes of the Reco element control behavior of the recognition server 204. The attribute "initialTimeout" 289 is the time between the start of recognition 283 and the detection of speech 285. If this time period is exceeded, "onSilence" event 291 will be provided from the recognition server 204, signaling that recognition has stopped. If the recognition server 204 finds the utterance to be unrecognizable, an "onNoReco" event 293 will be issued, which will also indicate that recognition has stopped.

Other attributes that can stop or cancel recognition include a "babbleTimeout" attribute 295, which is the period of time in which the recognition server 204 must return a result after detection of speech at 285. If exceeded, different events are issued according to whether an error has occurred or not. If the recognition server 204 is still processing audio, for example, in the case of an exceptionally long utterance, the "onNoReco" attribute 293 is issued. However, if the "babbleTimeout" attribute 295 is exceeded for any other reason, a recognizer error is more likely and an "onTimeout" event 297 is issued. Likewise, a "maxTimeout" attribute 299 can also be provided and is for the period of time between the start of recognition 283 and the results returned to the client 30. If this time period is exceeded, the "onTimeout" event 297 is issued.

If, however, a time period greater than an "endSilence" attribute 301 is exceeded, implying that recognition is complete, the recognition server 204 automatically stops recognition and returns its results. It should be noted that the recognition server 204 can implement a confidence measure to determine if the recognition results should be returned. If the confidence measure is below a threshold, the "onNoReco" attribute 293 is issued, whereas if the confidence measure is above the threshold a "onReco" attribute 303 and the results of recognition are issued. FIG. 12 thereby illustrates that in "automatic mode" no explicit stop ( ) calls are made.

Figure 13:
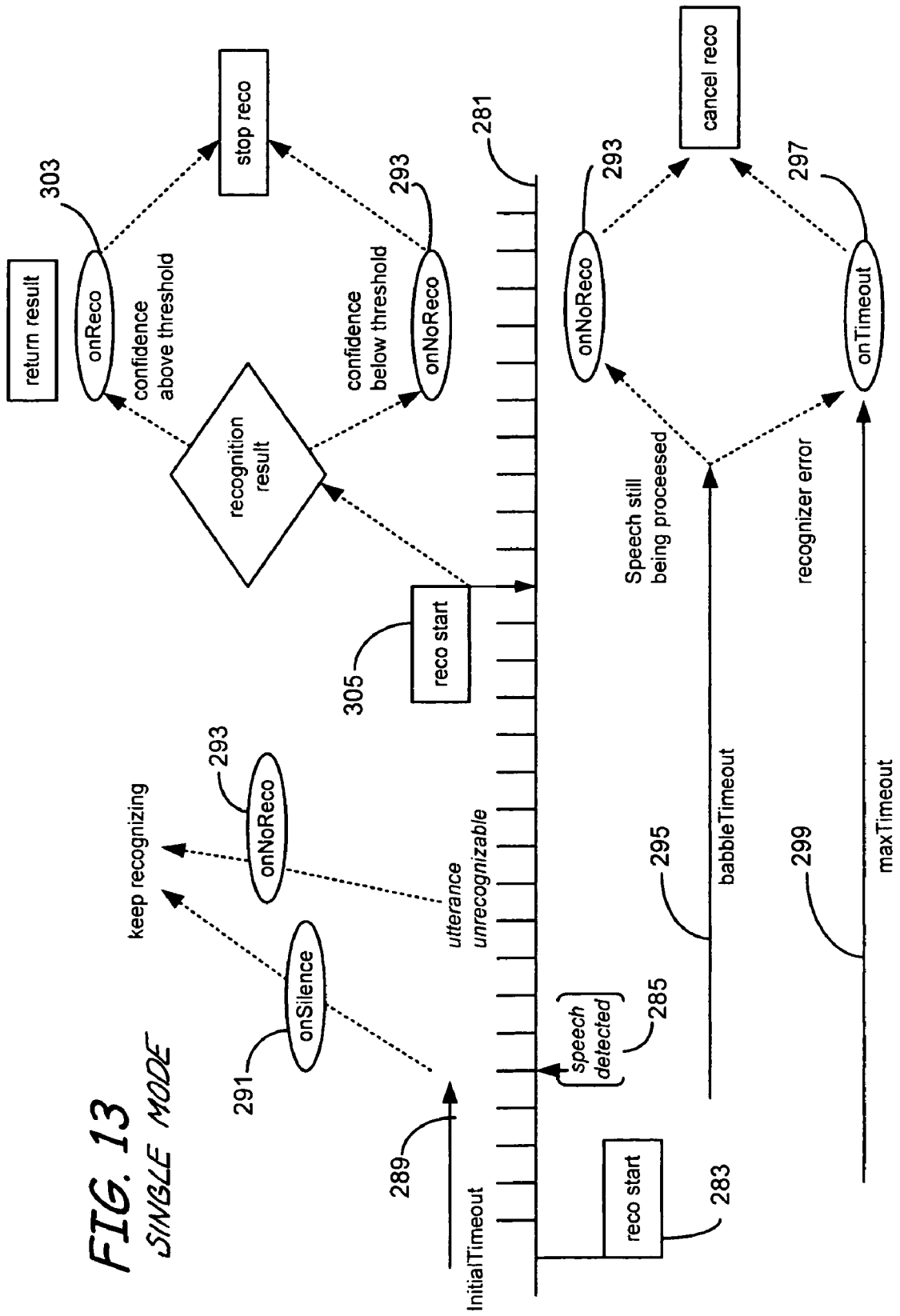
FIG. 13 is a pictorial illustration of a second operational mode of the recognition server.

FIG. 13 pictorially illustrates "single mode" operation of the recognition server 204. Attributes and events described above with respect to the "automatic mode" are applicable and are so indicated with the same reference numbers. However, in this mode of operation, a stop ( ) call 305 is indicated on timeline 281. The stop ( ) call 305 would correspond to an event such as "pen-up" by the user. In this mode of operation, the return of a recognition result is under the control of the explicit stop ( ) call 305. As with all modes of operation, the "onSilence" event 291 is issued if speech is not detected within the "initialTimeout" period 289, but for this mode of operation recognition is not stopped. Similarly, a "onNoReco" event 293 generated by an unrecognizable utterance before the stop ( ) call 305 does not stop recognition. However, if the time periods associated with the "babbleTimeout" attribute 295 or the "maxTimeout" attribute 299 are exceeded recognition will stop.

FIG. 14 pictorially illustrates "multiple mode" operation of the recognition server 204. As indicated above, this mode of operation is used for an "open-microphone" or in a dictation scenario. Generally, in this mode of operation, recognition results are returned at intervals until an explicit stop ( )_ call 305 is received or the time periods associated with the "babbleTimeout" attribute 295 or the "maxTimeout" attribute 299 are exceeded. It should be noted, however, that after any "onSilence" event 291, "onReco" event 303, or "onNoReco" event 293, which does not stop recognition, timers for the "babbleTimeout" and "maxTimeout" periods will be reset.

Generally, in this mode of operation, for each phrase that is recognized, a "onReco" event 303 is issued and the result is returned until the stop ( ) call 305 is received. If the "onSilence" event 291 is issued due to an unrecognizable utterance these events are reported but recognition will continue.

As indicated above, the associated reco object or objects for the field is activated, which includes providing at least an indication to the recognition server 204 of which grammar to use. This information can accompany the speech data recorded at the client 30 and sent to the recognition server 204. As indicated above, speech data can comprise streaming data associated with the speech entered by the user, or can include pre-processed speech data indicating speech features that are used during speech recognition. In a further embodiment, client side processing can also include normalization of the speech data such that the speech data received by the recognition server 204 is relatively consistent from client to client. This simplifies speech processing of the recognition server 204 thereby allowing easier scalability of the recognition server 204 since the recognition server can be made stateless with respect to the type of client and communication channel.

Upon receipt of the recognition result from the recognition server 204, the recognition result is associated with the corresponding field, and client-side verification or checking can be performed, if desired. Upon completion of all of the fields associated with the code currently rendered by the client, the information is sent to web server 202 for application processing. From the foregoing, it should be clear that although the web server 202 has provided code or scripts suitable for recognition to the client 30, the recognition services are not performed by the web server 202, but rather by the recognition server 204. The invention, however, does not preclude an implementation where the recognition server 204 is collocated with the web server 202, or the recognition server 204 is part of the client 30. In other words, the extensions provided herein are beneficial even when the recognition server 204 is combined with the web server 202 or client 30 because the extension provide a simple and convenient interface between these components.

While not shown in the embodiment illustrated in FIG. 8, the reco control can also include a remote audio object (RAO) to direct the appropriate speech data to the recognition server 204. The benefit for making RAO a plug-in object is to allow a different one for each different device or client because the sound interface may likely be different. In addition, the remote audio object can allow multiple reco elements to be activated at the same time.

FIGS. 9A and 9B illustrate a voice-only mark-up language embodied herein as HTML with scripts. As clearly illustrated, the code also includes a body portion 300 and a script portion 302. There is another extension of the markup language— prompt control 303 which include attributes like bargein. However, speech recognition is conducted differently in the voice-only embodiment of FIGS. 9A and 9B. The process is now controlled entirely by the script function "checkFilled" which will determine the unfilled fields and activate correspondent prompt and new objects. Nevertheless, grammars are activated using the same context as that described above with respect to FIG. 8, wherein speech data and the indication of the grammar to use are provided to the recognition server 204. Likewise, the output received from the recognition server 204 is associated with fields of the client (herein telephony voice browser 212).

Other features generally unique to voice-only applications is an indication to the user when speech has not been recognized. In multimodal applications such as FIG. 8, 'onNoReco' simply puts null value on the displayed field to indicate no-recognition, thus no further action is required. In the voice-only embodiment, "onNoReco" 305 calls or executes a function "mumble", which forwards a word phrase to recognition server 204, that in turn, is converted to speech using a suitable text-to-speech system 307 (FIG. 5). Recognition server 204 returns an audio stream to the telephony voice browser 212, which in turn, is transmitted to phone 80 to be heard by the user. Likewise, other waveform prompts embodied in the voice-only application are also converted, when necessary, to an audio stream by recognition server 204.

It should be noted that in this example after playing the welcome prompt via function "welcome", function "checkFilled" prompts the user for each of the fields and activates the appropriate grammars, including repeating the fields that have been entered and confirming that the information is correct, which includes activation of a "confirmation" grammar. Note in this embodiment, each of the reco controls is initiated from the script portion 302, rather than the body portion of the previous example.

The markup language is executable on different types of client devices (e.g. multimodal and non-display, voice input based client devices such as a telephone) unifies at least one of speech-related events, GUI events and telephony events for a web server interacting with each of the client devices. This is particular advantageous for it allows significant portions of the web server application to be written generically or independent of the type of client device. An example is illustrated in FIGS. 8 and 9A, 9B with the "handle" functions.

Although not shown in FIG. 9, there are two more extensions to the markup language to support telephony functionality—DTMF (Dual Tone Modulated Frequency) control and call control elements or objects. DTMF works similarly to reco control. It specifies a simple grammar mapping from keypad string to text input. For example, "1" means grocery department, "2" mean pharmacy department, etc. On the other hand, call object deals with telephony functions, like call transfer and $3^{rd}$ party call. The attributes, properties, methods and events are discussed in detail in the Appendix.

FIGS. 10A and 10B illustrate yet another example of a mark-up language suitable for a voice-only mode of operation. In this embodiment, the user is allowed to have some control over when information is entered or spoken. In other words, although the system may initiate or otherwise direct the user to begin speaking, the user may offer more information than what was initially asked for. This is an example of "mixed initiative". Generally, in this form of dialog interaction, the user is permitted to share the dialog initiative with the system. Besides the example indicated above and discussed below in detail where the user provides more information then requested by a prompt, the user could also switch tasks when not prompted to do so.

In the example of FIGS. 10A and 10B, a grammar identified as "do_field" includes the information associated with the grammars "p_card_num" "p_card_num" and "p_expiry_data". In this example, telephony voice browser 212 sends speech data received from phone 80 and an indication to use the "do_field" grammar to recognition server 204 upon receipt of the recognized speech as denoted by "onReco", the function "handle" is called or executed that includes associating the values for any or all of the fields recognized from the speech data. In other words, the result obtained from the recognition server 204 also includes indications for each of the fields. This information is parsed and associated with the corresponding fields according to binding rules specified in 405. As indicated in FIG. 5, the recognition server 204 can include a parser 309.

From FIGS. 7, 8, 9A, 9B, 10A and 10B, a very similar web development framework is used. Data presentation is also very similar in each of these cases. In addition, the separation of data presentation and flow controls allow maximum reusability between different applications (system initiative and mixed-initiative), or different modalities (GUI web-based, voice-only and multimodal). This also allows a natural extension from voice-only operation through a telephone to a multimodal operation when phones include displays and functionalities similar to device 30. Appendix A provides further details of the controls and objects discussed above.

Referring back to FIG. 5, web server 202 can include a server side plug-in declarative authoring tool or module 320 (e.g. ASP or ASP+ by Microsoft Corporation, JSP, or the like). Server side plug-in module 320 can dynamically generate client-side mark-ups and even a specific form of mark-up for the type of client accessing the web server 202. The client information can be provided to the web server 202 upon initial establishment of the client/server relationship, or the web server 202 can include modules or routines to detect the capabilities of the client. In this manner, server side plug-in module 320 can generate a client side mark-up for each of the voice recognition scenarios, i.e. voice only through phone 80 or multimodal for device 30. By using a consistent client side model (reco and prompt controls that can be used in each application), application authoring for many different clients is significantly easier.

In addition to dynamically generating client side mark-ups, high-level dialog modules, like getting credit card information illustrated in FIG. 6 with a mark-up examples of FIGS. 8, 9A and 9B, can be implemented as a server-side control as stored in store 324 for use by developers in application authoring. In general, the high-level dialog modules 324 would generate dynamically client-side markup and script in both voice-only and multimodal scenarios based on parameters specified by developers. The high-level dialog modules can include parameters to generate client-side mark-ups to fit the developers' needs. For example, a credit card information module can include a parameter indicating what types of credit cards the client/side mark-up script should allow. A sample ASP+ page using in server side plug-in module 320 is illustrated in FIG. 11.

Although the present invention has been described with reference to preferred embodiments, workers skilled in the art will recognize that changes may be made in form and detail without departing from the spirit and scope of the invention.

APPENDIX A

1 Introduction

The following tags are a set of markup elements that allows a document to use speech as an input or output medium. The tags are designed to be self-contained XML that can be imbedded into any SGML derived markup languages such as HTML, XHTML, cHTML, SMIL, WML and the like. The tags used herein are similar to SAPI 5.0, which are known methods available from Microsoft Corporation of Redmond, Wash. The tags, elements, events, attributes, properties, return values, etc. are merely exemplary and should not be considered limiting. Although exemplified herein for speech and DTMF recognition, similar tags can be provided for other forms of recognition.

The main elements herein discussed are:

<prompt ...> for speech synthesis configuration and prompt playing
    <reco ...> for recognizer configuration and recognition execution and post-processing
        <grammar ...> for specifying input grammar resources
        <bind ...> for processing of recognition results
    <dtmf ...> for configuration and control of DTMF

2 Reco

The Reco element is used to specify possible user inputs and a means for dealing with the input results. As such, its main elements are <grammar> and <bind>, and it contains resources for configuring recognizer properties.

Reco elements are activated programmatically in uplevel browsers via Start and Stop methods, or in SMIL-enabled browsers by using SMIL commands. They are considered active declaratively in downlevel browsers (i.e. non script-supporting browsers) by their presence on the page. In order to permit the activation of multiple grammars in parallel, multiple Reco elements may be considered active simultaneously.

Recos may also take a partcular mode—'automatic', 'single' or 'multiple'—to distinguish the kind of recognition scenarios which they enable and the behaviour of the recognition platform.

2.1 Reco Content

The Reco element contains one or more grammars and optionally a set of bind elements which inspect the results of recognition and copy the relevant portions to values in the containing page.

In uplevel browsers, Reco supports the programmatic activation and deactivation of individual grammar rules. Note also that all top-level rules in a grammar are active by default for a recognition context.

2.1.1 <Grammar> Element

The grammar element is used to specify grammars, either inline or referenced using the src attribute.

At least one grammar (either inline or referenced) is typically specified. Inline grammars can be text-based grammar formats, while referenced grammars can be text-based or binary type. Multiple grammar elements may be specified. If more than one grammar element is specified, the rules within grammars are added as extra rules within the same grammar. Any rules with the same name will be overwritten.

Attributes:

src: Optional if inline grammar is specified. URI of the grammar to be included. Note that all top-level rules in a grammar are active by default for a recognition context.

langID: Optional. String indicating which language speech engine should use. The string format follows the xml:lang definition. For example, langID="en-us" denotes US English. This attribute is only effective when the langID is not specified in the grammar URI. If unspecified, defaults to US English.

If the langID is specified in multiple places then langID follows a precedence order from the lowest scope—remote grammar file (i.e language id is specified within the grammar file) followed by grammar element followed by reco element.

<grammar src="Fromcity.xml" />
or
<grammar>
<rule toplevel="active">
  <p>from </p>
  <ruleref name="cities" />
</rule>
<rule name="cities">
  <l>
  <p> Cambridge </p>
  <p> Seattle </p>
  <p> London </p>
  </l>
</rule>
</grammar>

If both a src-referenced grammar and an inline grammar are specified, the inline rules are added to the referenced rules, and any rules with the same name will be overwritten.

2.1.2 <Bind> Element

The bind element is used to bind values from the recognition results into the page.

The recognition results consumed by the bind element can be an XML document containing a semantic markup language (SML) for specifying recognition results. Its contents include semantic values, actual words spoken, and confidence scores. SML could also include alternate recognition choices (as in an N-best recognition result). A sample SML document for the utterance "I'd like to travel from Seattle to Boston" is illustrated below:

```
<sml confidence="40">
    <travel text="I'd like to travel from
Seattle to Boston">
        <origin_city confidence="45"> Seattle
    </origin_city>
        <dest_city    confidence="35"> Boston
    </dest_city>
    </travel>
</sml>
```

Since an in-grammar recognition is assumed to produce an XML document—in semantic markup language, or SML—the values to be bound from the SML document are referenced using an XPath query. And since the elements in the page into which the values will be bound should be are uniquely identified (they are likely to be form controls), these target elements are referenced directly.

Attributes:

targetElement: Required. The element to which the value content from the SML will be assigned (as in W3C SMIL 2.0).

targetAttribute: Optional. The attribute of the target element to which the value content from the SML will be assigned (as with the attributeName attribute in SMIL 2.0). If unspecified, defaults to "value".

test: Optional. An XML Pattern (as in the W3C XML DOM specification) string indicating the condition under which the recognition result will be assigned. Default condition is true.

value: Required. An XPATH (as in the W3C XML DOM specification) string that specifies the value from the recognition result document to be assigned to the target element.

Example:

So given the above SML return, the following reco element uses bind to transfer the values in origin_city and dest_city into the target page elements txtBoxOrigin and txtBoxDest:

```
<input name="txtBoxOrigin" type="text"/>
<input name="txtBoxDest" type="text" />
<reco id="travel">
    <grammar src="./city.xml" />
    <bind    targetElement="txtBoxOrigin"
        value="//origin_city" />
    <bind    targetElement="txtBoxDest"
        value="//dest_city" />
</reco>
```

This binding may be conditional, as in the following example, where a test is made on the confidence attribute of the dest_city result as a pre-condition to the bind operation:

```
<bind targetElement="txtBoxDest"
    value="//dest_city"
    test="/sml/dest_city [@confidence $gt$ 40]"
/>
```

The bind element is a simple declarative means of processing recognition results on downlevel or uplevel browsers. For more complex processing, the reco DOM object supported by uplevel browsers implements the onReco event handler to permit programmatic script analysis and post-processing of the recognition return.

2.2 Attributes and Properties

The following attributes are supported by all browsers, and the properties by uplevel browsers.

2.2.1 Attributes

The following attributes of Reco are used to configure the speech recognizer for a dialog turn.

initialTimeout: Optional. The time in milliseconds between start of recognition and the detection of speech. This value is passed to the recognition platform, and if exceeded, an on Silence event will be provided from the recognition platform (see 2.4.2). If not specified, the speech platform will use a default value.

babbleTimeout: Optional. The period of time in milliseconds in which the recognizer must return a result after detection of speech. For recos in automatic and single mode, this applies to the period between speech detection and the stop call. For recos in 'multiple' mode, this timeout applies to the period between speech detection and each recognition return—i.e. the period is restarted after each return of results or other event. If exceeded, different events are thrown according to whether an error has occurred or not. If the recognizer is still processing audio—eg in the case of an exceptionally long utterance—the onNoReco event is thrown, with status code 13 (see 2.4.4). If the timeout is exceeded for any other reason, however, a recognizer error is more likely, and the onTimeout event is thrown. If not specified, the speech platform will default to an internal value.

maxTimeout: Optional. The period of time in milliseconds between recognition start and results returned to the browser. If exceeded, the onTimeout event is thrown by the browser—this caters for network or recognizer failure in distributed environments. For recos in 'multiple' mode, as with babbleTimeout, the period is restarted after the return of each recognition or other event. Note that the maxTimeout attribute should be greater than or equal to the sum of initialTimeout and babbleTimeout. If not specified, the value will be a browser default.

endSilence: Optional. For Recos in automatic mode, the period of silence in milliseconds after the end of an utterance which must be free of speech after which the recognition results are returned. Ignored for recos of modes other than automatic. If unspecified, defaults to platform internal value.

reject: Optional. The recognition rejection threshold, below which the platform will throw the 'no reco' event. If not specified, the speech platform will use a default value. Confidence scores range between 0 and 100 (integer). Reject values lie in between.

server: Optional. URI of speech platform (for use when the tag interpreter and recognition platform are not co-located). An example value might be server=protocol:// yourspeechplatform. An application writer is also able to provide speech platform specific settings by adding a querystring to the URI string, eg protocol://yourspeechplatform?bargeinEnergyThreshold=0.5.

langID: Optional. String indicating which language speech engine should use. The string format follows the xml:lang definition. For example, langID="en-us" denotes US English. This attribute is only effective when the langID is not specified in the grammar element (see 2.1.1).

mode: Optional. String specifying the recognition mode to be followed. If unspecified, defaults to "automatic" mode.

2.2.2 Properties

The following properties contain the results returned by the recognition process (these are supported by uplevel browsers).

recoResult Read-only. The results of recognition, held in an XML DOM node object containing semantic markup language (SML), as described in 2.1.2, In case of no recognition, the property returns null.

text Read-only. A string holding the text of the words recognized (i.e., a shorthand for contents of the text attribute of the highest level element in the SML recognition return in recoResult.

status: Read-only. Status code returned by the recognition platform. Possible values are 0 for successful recognition, or the failure values −1 to −4 (as defined in the exceptions possible on the Start method (section 2.3.1) and Activate method (section 2.3.4)), and statuses −11 to −15 set on the reception of recognizer events (see 2.4).

2.3 Object methods

Reco activation and grammar activation may be controlled using the following methods in the Reco's DOM object. With these methods, uplevel browsers can start and stop Reco objects, cancel recognitions in progress, and activate and deactivate individual grammar top-level rules (uplevel browsers only).

2.3.1 Start

The Start method starts the recognition process, using as active grammars all the top-level rules for the recognition context which have not been explicitly deactivated.

Syntax:
Object.Start( )
Return value:
None.
Exception:
The method sets a non-zero status code and fires an onNoReco event when fails. Possible failures include no grammar (reco status=−1), failure to load a grammar, which could be a variety of reasons like failure to compile grammar, non-existent URI (reco status=−2), or speech platform errors (reco status=−3).

2.3.2 Stop

The Stop method is a call to end the recognition process. The Reco object stops recording audio, and the recognizer returns recognition results on the audio received up to the point where recording was stopped. All the recognition resources used by Reco are released, and its grammars deactivated. (Note that this method need not be used explicitly for typical recognitions in automatic mode, since the recognizer itself will stop the reco object on endpoint detection after recognizing a complete sentence.) If the Reco has not been started, the call has no effect.

Syntax:
Object.Stop( )
Return value:
None.
Exception:
None.

2.3.3 Cancel

The Cancel method stops the audio feed to the recognizer, deactivates the grammar and releases the recognizer and discards any recognition results. The browser will disregard a recognition result for canceled recognition. If the recognizer has not been started, the call has no effect.

Syntax:
Object.Cancel( )
Return value:
None.
Exception:
None.

2.3.4 Activate

The Activate method activates a top-level rule in the context free grammar (CFG). Activation must be called before recognition begins, since it will have no effect during a 'Started' recognition process. Note that all the grammar top-level rules for the recognition context which have not been explicitly deactivated are already treated as active.

Syntax:
Object.Activate(strName);
Parameters:
strName: Required. Rule name to be activated.
Return value:
None.
Exception:
None.

2.3.5 Deactivate

The method deactivates a top-level rule in the grammar. If the rule does not exist, the method has no effect.

Syntax:
Object.Deactivate(strName);
Parameters:
strName: Required. Rule name to be deactivated. An empty string deactivates all rules.
Return value
None.
Exception
None.

2.4 Reco Events

The Reco DOM object supports the following events, whose handlers may be specified as attributes of the reco element.

2.4.1 onReco:

This event gets fired when the recognizer has a recognition result available for the browser. For recos in automatic mode, this event stops the recognition process automatically and clears resources (see 2.3.2). OnReco is typically used for programmatic analysis of the recognition result and processing of the result into the page.

| Syntax: | |
| --- | --- |
| Inline HTML | <Reco onReco ="harndler" > |
| Event property | Object.onReco = handler; |
| | Object.onReco = GetRef("handler"); |

| Event Object Info: | |
| --- | --- |
| Bubbles | No |
| To invoke | User says something |
| Default action | Return recognition result object |

Event Properties:

Although the event handler does not receive properties directly, the handler can query the event object for data (see the use of the event object in the example below).

Example

The following XHTML fragment uses onReco to call a script to parse the recognition outcome and assign the values to the proper fields.

```
<input name="txtBoxOrigin" type="text" />
<input name="txtBoxDest" type="text" />
<reco onReco="processCityRecognition( )"/>
    <grammar src="/grammars/cities.xml" />
</reco>
<script><![CDATA[
    function processCityRecognition ( ) {
        smlResult =
 event.srcElement.recoResult;
        origNode =
 smlResult.selectSingleNode("//origin_city");
        if (origNode != null)
 txtBoxOrigin.value = origNode.text;
        destNode =
 smlResult.selectSingleNode("//dest_city");
        if (destNode != null) txtBoxDest.value
 = destNode.text;
    }
]]></script>
```

2.4.2 onSilence:

onSilence handles the event of no speech detected by the recognition platform before the duration of time specified in the initialTimeout attribute on the Reco (see 2.2.1). This event cancels the recognition process automatically for the automatic recognition mode.

| Syntax: | |
|---|---|
| Inline HTML | <reco onSilence="handler" ...> |
| Event property (in ECMAScript) | Object.onSilence = handler<br>Object.onSilence =<br>GetRef ("handler"); |

| Event Object Info: | |
|---|---|
| Bubbles | No |
| To invoke | Recognizer did not detect speech within the period specified in the initialTimeout attribute. |
| Default action | Set status = −11 |

Event Properties:

Although the event handler does not receive properties directly, the handler can query the event object for data.

2.4.3 onTimeout onTimeout handles two types of event which typically reflect errors from the speech platform.

It handles the event thrown by the tags interpreter which signals that the period specified in the maxtime attribute (see 2.2.1) expired before recognition was completed. This event will typically reflect problems that could occur in a distributed architecture.

It also handles (ii) the event thrown by the speech recognition platform when recognition has begun but processing has stopped without a recognition within the period specified by babbleTimeout (see 2.2.1).

This event cancels the recognition process automatically.

| Syntax: | |
|---|---|
| Inline HTML | <reco onTimeout="handler" ...> |
| Event property (in ECMAScript) | Object.onTimeOut = handler<br>Object.onTimeOut =<br>GetRef("handler"); |

| Event Object Info: | |
|---|---|
| Bubbles | No |
| To invoke | Thrown by the browser when the period set by the maxtime attribute expires before recognition is stopped. |
| Default action | Set reco status to −12. |

Event Properties:

Although the event handler does not receive properties directly, the handler can query the event object for data.

2.4.4 onNoReco:

onNoReco is a handler for the event thrown by the speech recognition platform when it is unable to return valid recognition results. The different cases in which this may happen are distinguished by status code. The event stops the recognition process automatically.

| Syntax: | |
|---|---|
| Inline HTML | <Reco onNoReco ="handler" > |
| Event property | Object.onNoReco = handler;<br>Object.onNoReco =<br>GetRef ("handler"); |

| Event Object Info: | |
|---|---|
| Bubbles | No |
| To invoke | Recognizer detects sound but is unable to interpret the utterance. |
| Default action | Set status property and return null recognition result. Status codes are set as follows:<br>status −13: sound was detected but no speech was able to be interpreted;<br>status −14: some speech was detected and interpreted but rejected with insufficient confidence (for threshold setting, see the reject attribute in 2.2.1).<br>status −15: speech was detected and interpreted, but a complete recognition was unable to be returned between the detection of speech and the duration specified in the babbleTimeout attribute (see 2.2.1). |

Event Properties:

Although the event handler does not receive properties directly, the handler can query the event object for data.

3 Prompt

The prompt element is used to specify system output. Its content may be one or more of the following:

inline or referenced text, which may be marked up with prosodic or other speech output information;

variable values retrieved at render time from the containing document;

links to audio files.

Prompt elements may be interpreted declaratively by downlevel browsers (or activated by SMIL commands), or by object methods on uplevel browsers.

3.1 Prompt Content

The prompt element contains the resources for system output, either as text or references to audio files, or both.

Simple prompts need specify only the text required for output, eg:

<prompt id="Welcome">
 Thank you for calling ACME weather report.
</prompt>

This simple text may also contain further markup of any of the kinds described below.

3.1.1 Speech Synthesis Markup

Any format of speech synthesis markup language can be used inside the prompt element. (This format may be specified in the 'tts' attribute described in 3.2.1.) The following example shows text with an instruction to emphasize certain words within it:

<prompt id="giveBalance">
 You have <emph> five dollars </emph> left in your account.
</prompt>

3.1.2 Dynamic Content

The actual content of the prompt may need to be computed on the client just before the prompt is output. In order to confirm a particular value, for example, the value needs to be dereferenced in a variable. The value element may be used for this purpose.

Value Element value: Optional. Retrieves the values of an element in the document.

Attributes:

targetElement: Optional. Either href or targetElement must be specified. The id of the element containing the value to be retrieved.

targetAttribute: Optional. The attribute of the element from which the value will be retrieved.

href: Optional. The URI of an audio segment. href will override targetElement if both are present.

The targetElement attribute is used to reference an element within the containing document. The content of the element whose id is specified by targetElement is inserted into the text to be synthesized. If the desired content is held in an attribute of the element, the targetAttribute attribute may be used to specify the necessary attribute on the targetElement. This is useful for dereferencing the values in HTML form controls, for example. In the following illustration, the "value" attributes of the "txtBoxOrigin" and "txtBoxDest" elements are inserted into the text before the prompt is output <prompt id="Confirm">
 Do you want to travel from
 <value targetElement="txtBoxOrigin" targetAttribute="value"/>
 to
 <value targetElement="txtBoxDest" targetAttribute="value"/>
 ?
</prompt>

3.1.3 Audio Files

The value element may also be used to refer to a pre-recorded audio file for playing instead of, or within, a synthesized prompt. The following example plays a beep at the end of the prompt:

<prompt>
 After the beep, please record your message.
 <value href="/wav/beep.wav" />
</prompt>

3.1.4 Referenced Prompts

Instead of specifying content inline, the src attribute may be used with an empty element to reference external content via URI, as in:

<prompt id="Welcome"
 src="/ACMEWeatherPrompts#Welcome" />

The target of the src attribute can hold any or all of the above content specified for inline prompts.

3.2 Attributes and Properties

The prompt element holds the following attributes (downlevel browsers) and properties (downlevel and uplevel browsers).

3.2.1 Attributes tts: Optional. The markup language type for text-to-speech synthesis. Default is "SAPI 5".

src: Optional if an inline prompt is specified. The URI of a referenced prompt (see 3.1.4).

bargein: Optional. Integer. The period of time in milliseconds from start of prompt to when playback can be interrupted by the human listener. Default is infinite, i.e., no bargein is allowed. Bargein=0 allows immediate bargein. This applies to whichever kind of barge-in is supported by platform. Either keyword or energy-based bargein times can be configured in this way, depending on which is enabled at the time the reco is started.

prefetch: Optional. A Boolean flag indicating whether the prompt should be immediately synthesized and cached at browser when the page is loaded. Default is false.

3.2.2 Properties

Uplevel browsers support the following properties in the prompt's DOM object.

bookmark: Read-only. A string object recording the text of the last synthesis bookmark encountered.

status: Read-only. Status code returned by the speech platform.

3.3 Prompt Methods

Prompt playing may be controlled using the following methods in the prompt's DOM object. In this way, uplevel browsers can start and stop prompt objects, pause and resume prompts in progress, and change the speed and volume of the synthesized speech.

3.3.1 Start

Start playback of the prompt. Unless an argument is given, the method plays the contents of the object. Only a single prompt object is considered 'started' at a given time, so if Start is called in succession, all playbacks are played in sequence.

Syntax:
 Object.Start([strText]);

Parameters:
 strText: the text to be sent to the synthesizer. If present, this argument overrides the contents of the object.

Return value:
 None.

Exception:
 Set status=−1 and fires an onComplete event if the audio buffer is already released by the server.

3.3.2 Pause

Pause playback without flushing the audio buffer. This method has no effect if playback is paused or stopped.

Syntax:
    Object.Pause( );

Return value:
    None.

Exception:
    None.

3.3.3 Resume

Resume playback without flushing the audio buffer. This method has no effect if playback has not been paused.

Syntax:
    Object.Resume( );

Return value:
    None.

Exception:
    Throws an exception when resume fails.

3.3.4 Stop

Stop playback, if not already, and flush the audio buffer. If the playback has already been stopped, the method simply flushes the audio buffer.

Syntax:
    Object.Stop( );

Return value:
    None.

Exception:
    None.

3.3.5 Change

Change speed and/or volume of playback. Change may be called during playback.

Syntax:
    Object.Change(speed, volume);

Parameters:
    speed: Required. The factor to change. Speed=2.0 means double the current rate, speed=0.5 means halve the current rate, speed=0 means to restore the default value.
    volume: Required. The factor to change. Volume=2.0 means double the current volume, volume=0.5 means halve the current volume, volume=0 means to restore the default value.

Return value:
    None.

Exception:
    None.

3.3.6 Prompt Control Example

The following example shows how control of the prompt using the methods above might be authored for a platform which does not support a keyword barge-in mechanism.

```
<html>
    <title>Prompt control</title>
    <head>
        <script>
            <!- -
            function checkKWBargein( ) {
                news.change(1.0, 0.5); // turn down the
volume while verifying
                if (keyword.text == "") { // result is below
threshold
                    news.change(1.0, 2.0); // restore the
volume
                    keyword.Start( ); // restart the
recognition
                } else {
                    news.Stop( ); // keyword detected! Stop
the prompt
                    // Do whatever that is necessary
                }
            }
            //
        </script>
        <script for="window" event="onload">
            <!- -
                news.Start( ); keyword.Start( );
            //
        </script>
    </head>
    <body>
        <prompt id="news" bargein="0">
```

Stocks turned in another lackluster performance Wednesday as investors received little incentive to make any big moves ahead of next week's Federal Reserve meeting. The tech-heavy Nasdaq Composite Index dropped 42.51 points to close at 2156.26. The Dow Jones Industrial Average fell 17.05 points to 10866.46 after an early-afternoon rally failed.

```
- <!--
        </prompt>
        <reco       id="keyword"
            reject ="70"
            onReco="checkKWBargein( )" >
            <grammar
src=http://denali/news_bargein_grammar.xml />
        </reco>
    </body>
</html>
```

3.4 Prompt Events

The prompt DOM object supports the following events, whose handlers may be specified as attributes of the prompt element.

3.4.1 onBookmark

Fires when a synthesis bookmark is encountered. The event does not pause the playback.

| Syntax: | |
| --- | --- |
| Inline HTML | <prompt onBookmark="handler" ...> |
| Event property | Object.onBookmark = handler<br>Object.onBookmark = GetRef ("handler"); |

| Event Object Info: | |
| --- | --- |
| Bubbles | No |
| To invoke | A bookmark in the rendered string is encountered |
| Default action | Returns the bookmark string |

Event Properties:

Although the event handler does not receive properties directly, the handler can query the event object for data.

3.4.2 onBargein:

Fires when a user's barge-in event is detected. (Note that determining what constitutes a barge-in event, eg energy detection or keyword recognition, is up to the platform.) A specification of this event handler does not automatically turn the barge-in on.

| Syntax: | |
|---|---|
| Inline HTML | <prompt onBargein="handler" ...> |
| Event property | Object.onBargein = handler<br>Object.onBargein = GetRef ("handler"); |

| Event Object Info: | |
|---|---|
| Bubbles | No |
| To invoke | A bargein event is encountered |
| Default action | None |

Event Properties:

Although the event handler does not receive properties directly, the handler can query the event object for data.

3.4.3 onComplete:

Fires when the prompt playback reaches the end or exceptions (as defined above) are encountered.

| Syntax: | |
|---|---|
| Inline HTML | <prompt onComplete="handler" ...> |
| Event property | Object. onComplete = handler<br>Object. onComplete = GetRef ("handler"); |

| Event Object Info: | |
|---|---|
| Bubbles | No |
| To invoke | A prompt playback completes |
| Default action | Set status = 0 if playback completes normally, otherwise set status as specified above. |

Event Properties:

Although the event handler does not receive properties directly, the handler can query the event object for data.

3.4.4 Using Bookmarks and Events

The following example shows how bookmark events can be used to determine the semantics of a user response—either a correction to a departure city or the provision of a destination city—in terms of when bargein happened during the prompt output. The on Bargein handler calls a script which sets a global 'mark' variable to the last bookmark encountered in the prompt, and the value of this 'mark' is used in the reco's postprocessing function ('heard') to set the correct value.

```
<script><! [CDATA [
    var mark;
    function interrupt( ) {
        mark = event.srcElement.bookmark;
    }
    function ProcessCityConfirm( ) {
        confirm.stop( ); // flush the audio buffer
        if (mark == "mark_origin_city")
            txtBoxOrigin.value = event.srcElement.text;
        else
            txtBoxDest.value = event.srcElement.text;
    }
]]></script>
<body>
<input name="txtBoxOrigin" value="Seattle" type="text"!/>
<input name="txtBoxDest" type="text" />
...
<prompt id="confirm" onBargein="interrupt ( )" bargein="0">
    From <bookmark mark="mark_origin_city" />
    <value targetElement="orgin" targetAttribute="value" />,
    please say <bookmark mark="mark_dest_city" /> the
    destination city you want to travel to.
</prompt>
<reco onReco="ProcessCityConfirm( )" >
<grammar src="/grm/1033/cities.xml" />
</reco>
...
</body>
```

4 DTMF

Creates a DTMF recognition object. The object can be instantiated using inline markup language syntax or in scripting. When activated, DTMF can cause prompt object to fire a barge-in event. It should be noted the tags and eventing discussed below with respect to DTMF recognition and call control discussed in Section 5 generally pertain to interaction between the voice browser 216 and media server 214.

4.1 Content dtmfgrammar: for inline grammar.

bind: assign DTMF conversion result to proper field.

Attributes:

targetElement: Required. The element to which a partial recognition result will be assigned to (cf. same as in W3C SMIL 2.0).

targetAttribute: the attribute of the target element to which the recognition result will be assigned to (cf. same as in SMIL 2.0). Default is "value".

test: condition for the assignment. Default is true.

Example 1: Map Keys to Text

```
<input type="text" name="city"/>
<DTMF id="city_choice" timeout="2000" numDigits="1">
    <dtmfgrammar>
        <key value="1" >Seattle</key>
        <key value="2" >Boston</key>
    </dtmfgrammar>
    <bind targetElement="city" targetAttribute="value" />
</DTMF>
```

When "city choice" is activated, "Seattle" will be assigned to the input field if the user presses 1, "Boston" if 2, nothing otherwise.

Example 2: How DTMF can be Used with Multiple Fields.

```
<input type="text" name="area_code" />
<input type="text" name="phone_number" />
<DTMF id="areacode" numDigits="3"
   onReco="extension.Activate( )">
        <bind targetElement="area_code" />
</DTMF>
<DTMF id="extension" numDigits="7">
        <bind targetElement="phone_number" />
</DTMF>
```

This example demonstrates how to allow users entering into multiple fields.

Example 3: How to Allow Both Speech and DTMF Inputs and Disable Speech when User Starts DTMF.

```
<input type="text" name="credit_card_number" />
<prompt onBookmark="dtmf.Start( ); speech.Start( )"
    bargein="0">
    Please say <bookmark name="starting" />
    or enter your credit card number now
</prompt>
<DTMF id="dtmf" escape="#" length="16"
   interdigitTimeout="2000"
        onkeypress="speech.Stop( )">
        <bind targetElement="credit_card_number" />
</DTMF>
<reco id="speech" >
        <grammar src="/grm/1033/digits.xml" />
        <bind targetElement="credit_card_number" />
</reco>
```

4.2 Attributes and Properties 4.2.1 Attributes dtmfgrammar: Required. The URI of a DTMF grammar.

4.2.2 Properties

DTMFgrammar Read-Write.

An XML DOM Node object representing DTMF to string conversion matrix (also called DTMF grammar). The default grammar is

```
<dtmfgrammar>
   <key value="0">0</key>
   <key value="1">1</key>
   . . .
   <key value="9">9</key>
   <key value="*">*</key>
   <key value="#">#</key>
</dtmfgrammar >
``` flush

Read-write, a Boolean flag indicating whether to automatically flush the DTMF buffer on the underlying telephony interface card before activation. Default is false to enable type-ahead.

escape

Read-Write. The escape key to end the DTMF reading session. Escape key is one key.

numDigits

Read-Write. Number of key strokes to end the DTMF reading session. If both escape and length are specified, the DTMF session is ended when either condition is met.

dtmfResult

Read-only string, storing the DTMF keys user has entered. Escape is included in result if typed.

text

Read-only string storing white space separated token string, where each token is converted according to DTMF grammar.

initialTimeout

Read-Write. Timeout period for receiving the first DTMF keystoke, in milliseconds. If unspecified, defaults to the telephony platform's internal setting.

interdigitTimeout

Read-Write. Timeout period for adjacent DTMF keystokes, in milliseconds. If unspecified, defaults to the telephony platform's internal setting.

4.3 Object Methods:

4.3.1 Start

Enable DTMF interruption and start a DTMF reading session.

Syntax:
    Object.Start( );
Return value:
    None
Exception:
    None 4.3.2 Stop Disable DTMF. The key strokes entered by the user, however, remain in the buffer.

Syntax:
    Object.Stop( );
Return value:
    None
Exception:
    None 4.3.3 Flush Flush the DTMF buffer. Flush can not be called during a DTMF session.

Syntax:
    Object.Flush( );
Return value:
    None
Exception:
    None 4.4 Events 4.4.1 onkeypress Fires when a DTMF key is press. This overrides the default event inherited from the HTML control. When user hits the escape key, the onRec event fires, not on Keypress.

| | Syntax: |
|---|---|
| Inline HTML | <DTMF onkeypress="handler" ...> |
| Event property | Object.onkeypress = handler |
| | Object onkeypress = |
| | GetRef ("handler"); |

| | Event Object Info: |
|---|---|
| Bubbles | No |
| To invoke | Press on the touch-tone telephone key pad |
| Default action | Returns the key being pressed |

Event Properties:

Although the event handler does not receive properties directly, the handler can query the event object for data.

4.4.2 onReco

Fires when a DTMF session is ended. The event disables the current DTMF object automatically.

|             | Syntax:                          |
|-------------|----------------------------------|
| Inline HTML | <DTMF onReco="handler" ...>      |
| Event property | Object.onReco = handler       |
|             | Object.onReco = GetRef("handler"); |

|             | Event Object Info:                                                          |
|-------------|------------------------------------------------------------------------------|
| Bubbles     | No                                                                           |
| To invoke   | User presses the escape key or the number of key strokes meets specified value. |
| Default action | Returns the key being pressed                                             |

Event Properties:

Although the event handler does not receive properties directly, the handler can query the event object for data.

4.4.3 onTimeout

Fires when no phrase finish event is received before time out. The event halts the recognition process automatically.

|                            | Syntax:                            |
|----------------------------|------------------------------------|
| Inline HTML                | <DTMF onTimeout="handler" ...>     |
| Event property (in ECMAScript) | Object.onTimeout = handler     |
|                            | Object.onTimeout = GetRef("handler"); |

|             | Event Object Info:                                       |
|-------------|-----------------------------------------------------------|
| Bubbles     | No                                                        |
| To invoke   | No DTMF key stroke is detected within the timeout specified. |
| Default action | None                                                   |

Event Properties:

Although the event handler does not receive properties directly, the handler can query the event object for data.

5 CallControl Object

Represents the telephone interface (call, terminal, and connection) of the telephone voice browser. This object is as native as window object in a GUI browser. As such, the lifetime of the telephone object is the same as the browser instance itself. A voice browser for telephony instantiates the telephone object, one for each call. Users don't instantiate or dispose the object.

At this point, only features related to first-party call controls are exposed through this object.

5.1 Properties address

Read-only. XML DOM node object. Implementation specific. This is the address of the caller. For PSTN, may a combination of ANI and ALI. For VoIP, this is the caller's IP address.

ringsBeforeAnswer

Number of rings before answering an incoming call. Default is infinite, meaning the developer must specifically use the Answer( ) method below to answer the phone call. When the call center uses ACD to queue up the incoming phone calls, this number can be set to 0.

5.2 Methods

Note: all the methods here are synchronous.

5.2.1 Transfer

Transfers the call. For a blind transfer, the system may terminate the original call and free system resources once the transfer completes.

Syntax:
    telephone.Transfer(strText);

Parameters:
    strText: Required. The address of the intended receiver.

Return value:
    None.

Exception:
    Throws an exception when the call transfer fails. e.g., when end party is busy, no such number, fax or answering machine answers.

5.2.2 Bridge

Third party transfer. After the call is transferred, the browser may release resources allocated for the call. It is up to the application to recover the session state when the transferred call returns using strUID. The underlying telephony platform may route the returning call to a different browser. The call can return only when the recipient terminates the call.

Syntax:
    telephone.Bridge(strText, strUID, [imaxTime]);

Parameters:
    strText: Required. The address of the intended receiver.
    strUID: Required. The session ID uniquely identifying the current call. When the transferred call is routed back, the srtUID will appear in the address attribute.
    imaxTime: Optional. Maximum duration in seconds of the transferred call. If unspecified, defaults to platform-internal value Return value:
    None.

Exception:
    None.

5.2.3 Answer

Answers the phone call.

Syntax:
    telephone.Answer( );

Return value:
    None.

Exception:
    Throws an exception when there is no connection. No onAnswer event will be fired in this case.

5.2.4 Hangup

Terminates the phone call. Has no effect if no call currently in progress.

Syntax:
    telephone.Hangup( );

Return value:
    None.

Exception:
    None.

5.2.5 Connect
Starts a first-party outbound phone call.
Syntax:
  telephone.Connect(strText, [iTimeout]);
Parameters:
  strText: Required. The address of the intended receiver.
  iTimeout: Optional. The time in milliseconds before abandoning the attempt. If unspecified, defaults to platform-internal value.
Return value:
  None.
Exception:
  Throws an exception when the call cannot be completed, including encountering busy signals or reaching a FAX or answering machine (Note: hardware may not support this feature).

5.2.6 Record
Record user audio to file.
Syntax:
  telephone.Record(url, endSilence, [maxTimeout], [initialTimeout]);
Parameters:
  url: Required. The url of the recorded results.
  endSilence: Required. Time in milliseconds to stop recording after silence is detected.
  maxTimeout: Optional. The maximum time in seconds for the recording. Default is platform-specific.
  initialTimeout: Optional. Maximum time (in milliseconds) of silence allowed at the beginning of a recording.
Return value:
  None.
Exception:
  Throws an exception when the recording can not be written to the url.

5.3 Event Handlers
App developers using telephone voice browser may implement the following event handlers.

5.3.1 onIncoming( )
Called when the voice browser receives an incoming phone call. All developers can use this handler to read caller's address and invoke customized features before answering the phone call.

5.3.2 onAnswer( )
Called when the voice browser answers an incoming phone call.

5.3.3 onHangup( )
Called when user hangs up the phone. This event is NOT automatically fired when the program calls the Hangup or Transfer methods.

5.4 Example
This example shows scripting wired to the call control events to manipulate the telephony session.

```
<HTML>
<HEAD>
    <TITLE>Logon Page</TITLE>
</ HEAD>
    <SCRIPT>
    var focus;
    function RunSpeech( ) {
        if (logon.user.value == "") {
            focus="user";
            p__uid.Start( ); g__login.Start( );
            dtmf.Start( ); return;
        }
        if (logon.pass.value == "") {
            focus="pin";
            p__pin.Start( ); g__login.Start( );
            dtmf.Start( ); return;
        }
        p__thank.Start( ); logon.submit( );
    }
    function login__reco( ) {
        res = event.srcElement.recoResult;
        pNode = res.selectSingleNode("//uid");
        if (pNode != null)
            logon.user.value = pNode.xml;
        pNode = res.selectSingleNode ("//password");
        if (pNode != null)
            logon.pass.value = pNode.xml;
    }
    function dtmf__reco( ) {
        res = event.srcElement.dtmfResult;
        if (focus == "user")
            logon.user.value = res;
        else
            logon.pin.value = res;
    }
    </SCRIPT>
    <SCRIPT for="callControl" event="onIncoming">
    <!--
        // read address, prepare customized stuff if any
        callControl.Answer( );
    //
    </SCRIPT>
    <SCRIPT for="callControl" event="onOffhook">
    <!--
        p__main.Start( ); g__login.Start( ); dtmf.Start( );
        focus="user";
    //
    </SCRIPT>
    <SCRIPT for="window" event="onload">
    <!--
        if (logon.user.value != "") {
            p__retry.Start( );
            logon.user.value = "";
            logon.pass.value= "";
            checkFields( );
        }
    //
    </SCRIPT>
<BODY>
    <reco id="g__login"
        onReco="login__reco( ); runSpeech( )"
        timeout="5000"
        onTimeout="p__miss.Start( ); RunSpeech( )" >
        <grammar
    src=http://kokanee1/etradedemo/speechonly/login.xml/>
        </ reco >
    <dtmf id="dtmf"
        escape="#"
        onkeypress="g__login.Stop( );"
        onReco="dtmf__reco( );RunSpeech( )"
        interdigitTimeout="5000"
        onTimeout="dtmf.Flush( );
        p__miss.Start( );RunSpeech( )" />
    <prompt id="p__main">Please say your user I D and pin number</prompt>
    <prompt id="p__uid">Please just say your user I D</prompt>
    <prompt id="p__pin">Please just say your pin number</prompt>
    <prompt id="p__miss">Sorry, I missed that</prompt>
    <prompt id="p__thank">Thank you. Please wait while I verify your identity</prompt>
    <prompt id="p__retry">Sorry, your user I D and pin number do not match</prompt>
    <H2 >Login</H2>
<form id="logon">
        UID:    <input name="user" type="text"
            onChange="runspeech( )" />
        PIN:    <input name="pass" type="password"
            onChange="RunSpeech( )" />
```

```
</form>
</BODY>
</HTML>
```

6 Controlling Dialog Flow

6.1 Using HTML and Script to Implement Dialog Flow

This example shows how to implement a simple dialog flow which seeks values for input boxes and offers context-sensitive help for the input. It uses the title attribute on the HTML input mechanisms (used in a visual browser as a "tooltip" mechanism) to help form the content of the help prompt.

```
<html>
    <title>Context Sensitive Help</title>
<head>
    <script>   var focus;
        function RunSpeech( ) {
            if (trade.stock.value == "") {
                focus="trade.stock";
                p_stock.Start( );
                return;
            }
            if (trade.op.value == "") {
                focus="trade.op";
                p_op.Start( );
                return;
            }
            //.. repeat above for all fields
            trade.submit( );
        }
        function handle( ) {
            res = event.srcElement.recoResult;
            if (res.text == "help") {
                text = "Please just say";
                text += document.all[focus].title;
                p_help.Start(text);
            } else {
                // proceed with value assignments
            }
        }
    </script>
</head>
<body>
    <prompt id="p_help" onComplete="checkFileds( )" />
    <prompt id="p_stock"
onComplete="g_stock.Start( )">Please say the stock
name</prompt>
    <prompt id="p_op" onComplete="g_op.Start( )">Do you
want to buy or sell</prompt>
    <prompt id="p_quantity"
onComplete="g_quantity.Start( )">How many
shares?</prompt>
    <prompt id="p_price"
onComplete="g_price.Start( )">What's the price</prompt>
    <reco id="g_stock" onReco="handle( ); checkFields( )" >
        <grammar src="./g_stock.xml" />
    </ reco >
    <reco id="g_op" onReco="handle( ); checkFields( )" />
        <grammar src="./g_op.xml" />
    </ reco >
    <reco id="g_quantity" onReco="handle( ); checkFields( )"
/>
        <grammar src="./g_quant.xml" />
    </ reco >
    <reco id="g_price" onReco="handle( ); checkFields( )" />
        <grammar src="./g_quant.xml" />
    </ reco >
    <form id="trade">
        <input name="stock" title="stock name" />
        <select name="op" title="buy or sell">
            <option value="buy" />
            <option value="sell" />
        </select>
        <input name="quantity" title="number of shares" />
        <input name="price" title="price" />
    </form>
</body>
</html>
```

6.2 Using SMIL

The following example shows activation of prompt and reco elements using SMIL mechanisms.

```
<html xmlns:t="urn:schemas-microsoft-com:time"
        xmlns:sp="urn:schemas-microsoft-
com:speech">
<head>
<style>
    .time { behavior: url(#default#time2); }
</style>
</head>
<body>
<input name="txtBoxOrigin" type="text"/>
<input name="txtBoxDest" type="text" />
<sp:prompt class="time" t:begin="0">
    Please say the origin and destination cities
</sp:prompt>
<t:par t:begin="time.end"
t:repeatCount="indefinitely"
    <sp:reco class="time" >
        <grammar src=./city.xml" />
        <bind targetElement="txtBoxOrigin"
            value="//origin_city" />
        <bind targetElement="txtBoxDest"
            test="/sml/dest_city[@confidence $gt$ 40]"
            value="//dest_city" />
    </sp:reco>
</t:par>
</body>
</html>
```

What is claimed is:

1. A server/client system for processing data, the system comprising:
    a network comprising:
        a web server having information accessible remotely;
        a recognition server;
        a first client device adapted to receive information from the web server and having a visual interface browser to access information from the web server and a rendering device to visually indicate fields to be entered, the first client device configured to record input speech data associated with each of the fields upon an indication by a user of the first client device of which field subsequent input is intended for, and wherein the first client device is adapted to send the input speech data to the recognition server remote from the first client device;
        a second client device, remote from the first client device, having a microphone and a speaker and adapted to receive information from the web server, the second client device configured to record input speech data associated with each of a set of fields in response to prompts given to a user of the second client device, and wherein the second client device is adapted to send the input speech data to the same recognition server as used by the first client device, the recognition server being remote from the second client device, wherein the second client device comprises a telephone and a voice browser capable of rendering the information from the web server audibly; and wherein the recognition server is configured to receive the input speech data from both of the client devices separately, process the input speech data from each client device using an associated grammar, and return data indicative of what was recognized to at least one of the client device providing the input speech data and the web server; and wherein the recognition server is configured to receive data indicative of a prompt for the user to be used when the recognition results are indicative of no recognition of the input speech data from one of the client devices, convert the data indicative of the prompt to audible speech data when the recognition results are indicative of no recognition of the input speech data from said one of the client devices, and send the audible speech data to said one of the client devices over the wide area network.

2. The system of claim 1 wherein each client device is adapted to normalize the input speech data prior to sending the input speech data to the recognition server.

3. The system of claim 1 wherein the information received from the web server and provided to each of the client devices is a markup language.

4. The system of claim 3 wherein the markup language received by the client devices comprises one or several markup portions and one or several script portions.

5. The system of claim 4 wherein the markup language comprises one of HTML, XHTML, cHTML, XML and WML.

6. The system of claim 4 wherein the markup language includes an indication associating a grammar with a field, the indication having the same form from each of the client devices.

7. The system of claim 6 wherein the recognition server receives the input speech data and the indication of the grammar.

8. The system of claim 7 wherein the grammar is stored on each of the client devices and transferred to the recognition server with the input speech data.

9. The system of claim 1 wherein each of the client devices is adapted to normalize the input speech data prior to sending the input speech data to the recognition server.

10. The system of claim 1 wherein the web server includes a server side plug-in module for dynamically generating markup language for each of the client devices.

11. The system of claim 10 wherein the server side plug-in module dynamically generates markup language as a function of the type of client device.

12. The system of claim 11 wherein the server side plug-in module detects the type of client device.

13. The system of claim 10 wherein the web server includes a plurality of dialog modules accessible by the server side plug-in module, each dialog module pertaining to obtaining data using speech recognition, the server side plug-in module generating the markup language as a function of a dialog module.

14. The system of claim 1 wherein the web server and the recognition server are located on a single machine.

15. A server/client system for processing data, the system comprising:
a network comprising:
a web server having information accessible remotely;
a recognition server;
a first client device receiving information from the web server and having a visual interface browser to access information from the web server and a rendering device to visually indicate fields to be entered, the first client device recording input data associated with each of the fields upon an indication by a user of the first client device of which field subsequent input is intended for, and wherein the first client device sends the input data to the recognition server;
a second client device, remote from the first client device, comprising a telephone and having a browser, a microphone and an audible rendering component, the second client device configured obtaining the information from the web server, the information having corresponding fields, the second client device further recording input data associated with each of the fields, and wherein the second client device is adapted to send the input data to the recognition server; and
wherein the recognition server is remote from and operatively connected to the web server, the first client device and the second client device via a wide area network, the same recognition server receiving the input data from both the first client device and the second client device separately and returning data indicative of what was recognized based on an associated grammar to at least one of the client devices providing the input data and the web server; and wherein the recognition server receives data indicative of a prompt for the user to be used when the recognition results are indicative of no recognition of the input from one of the client devices, converts the data indicative of the prompt to audible speech data when the recognition results are indicative of no recognition of the input from said one of the client devices, and sends the audible speech data to said one of the client devices over the wide area network.

16. The system of claim 15 wherein the information received from the web server and provided to each of the client devices is a markup language.

17. The system of claim 16 wherein the markup language comprises one of HTML, XHTML, cHTML, XML and WML.

18. The system of claim 15 wherein the grammar is stored on at least one of the client devices and transferred to the recognition server with the input data.

19. The system of claim 15 wherein the grammar is stored on the recognition server and wherein the indication of the grammar includes a reference to the grammar for the recognition server.

20. A method for processing voice recognition in a client/server system comprising:
transmitting information from a web server a markup language page having extensions configured to obtain input data from a user a first client device and a user of a second client device, wherein the first client device and the second client device are remote from each other and communicate with the web server over a wide area network, the first client device having a visual interface browser to access information from the web server and a visual rendering device, and the second client device comprising a telephone and a voice browser to access information from the web server;
rendering the markup language page on each of the client devices;
obtaining input data as a function of input from each of the users of the corresponding client devices;

transmitting the input data and an indication of an associated grammar over the wide area network to a single recognition server remote from each of the client devices, the recognition server being connected to the wide area network;

processing the input data with the associated grammar using the single recognition server;

transmitting a recognition result from the single recognition server indicative of what was inputted from each client device over the wide area network to at least one of the corresponding client device providing the input and the web server;

receiving over the wide area network and at the single recognition server data indicative of a prompt for the user to be used when the recognition results are indicative of no recognition of the input from one of the client devices;

converting at the single recognition server the data indicative of the prompt to audible speech data when the recognition results are indicative of no recognition of the input from said one of the client devices; and sending the audible speech data to said one of the client devices over the wide area network.

21. The method of claim 20 wherein rendering the markup language includes rendering audible prompts.

22. The method of claim 20 wherein the markup language comprises one of HTML, XHTML, cHTML, XML and WML.

23. The method of claim 20 wherein transmitting the indication of the grammar comprises transmitting the grammar.

24. The method of claim 20 wherein transmitting the indication of the grammar comprises transmitting a reference to the recognition server as to where the grammar is located.

* * * * *